United States Patent
Umezaki et al.

(10) Patent No.: US 8,619,104 B2
(45) Date of Patent: Dec. 31, 2013

(54) LIQUID CRYSTAL DISPLAY DEVICE AND ELECTRONIC DEVICE

(75) Inventors: Atsushi Umezaki, Isehara (JP); Hiroyuki Miyake, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 321 days.

(21) Appl. No.: 13/021,215

(22) Filed: Feb. 4, 2011

(65) Prior Publication Data

US 2011/0199404 A1 Aug. 18, 2011

(30) Foreign Application Priority Data

Feb. 12, 2010 (JP) ................................ 2010-028965

(51) Int. Cl.
*G09G 5/10* (2006.01)

(52) U.S. Cl.
USPC .............................. 345/691; 345/99; 345/204

(58) Field of Classification Search
USPC .................... 345/87–100, 204–215, 690–699
See application file for complete search history.

(56) References Cited

U.S. PATENT DOCUMENTS

| | | | |
|---|---|---|---|
| 5,731,856 A | 3/1998 | Kim et al. | |
| 5,744,864 A | 4/1998 | Cillessen et al. | |
| 5,767,832 A | 6/1998 | Koyama et al. | |
| 5,821,910 A * | 10/1998 | Shay ................................ | 345/99 |
| 5,900,886 A * | 5/1999 | Shay ............................... | 345/691 |
| 6,294,274 B1 | 9/2001 | Kawazoe et al. | |
| 6,310,600 B1 | 10/2001 | Koyama et al. | |
| 6,563,174 B2 | 5/2003 | Kawasaki et al. | |
| 6,614,418 B2 | 9/2003 | Koyama et al. | |
| 6,727,522 B1 | 4/2004 | Kawasaki et al. | |
| 6,956,553 B2 | 10/2005 | Tsutsui et al. | |
| 7,049,190 B2 | 5/2006 | Takeda et al. | |
| 7,061,014 B2 | 6/2006 | Hosono et al. | |
| 7,064,346 B2 | 6/2006 | Kawasaki et al. | |
| 7,105,868 B2 | 9/2006 | Nause et al. | |

(Continued)

FOREIGN PATENT DOCUMENTS

| | | |
|---|---|---|
| EP | 1737044 A | 12/2006 |
| EP | 1939842 A | 7/2008 |

(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters) , Sep. 27, 2004, vol. 85, No. 13, pp. 2541-2543.

(Continued)

*Primary Examiner* — Dmitriy Bolotin
(74) *Attorney, Agent, or Firm* — Eric J. Robinson; Robinson Intellectual Property Law Office, P.C.

(57) ABSTRACT

It is an object to suppress deterioration of a displayed still image which is caused when a refresh rate is reduced. A liquid crystal display device includes a display portion controlled by a driver circuit and a timing controller for controlling the driver circuit. An image signal for displaying a still image is supplied to the timing controller. By the timing controller, a refresh rate in displaying an image corresponding to an image signal on the display portion reduced as a gray level number of the image signal is smaller.

26 Claims, 14 Drawing Sheets

(56) References Cited

U.S. PATENT DOCUMENTS

| | | | |
|---|---|---|---|
| 7,211,825 B2 | 5/2007 | Shih et al | |
| 7,282,782 B2 | 10/2007 | Hoffman et al. | |
| 7,297,977 B2 | 11/2007 | Hoffman et al. | |
| 7,323,356 B2 | 1/2008 | Hosono et al. | |
| 7,385,224 B2 | 6/2008 | Ishii et al. | |
| 7,402,506 B2 | 7/2008 | Levy et al. | |
| 7,411,209 B2 | 8/2008 | Endo et al. | |
| 7,432,898 B2 | 10/2008 | Tsutsui et al. | |
| 7,453,065 B2 | 11/2008 | Saito et al. | |
| 7,453,087 B2 | 11/2008 | Iwasaki | |
| 7,462,862 B2 | 12/2008 | Hoffman et al. | |
| 7,468,304 B2 | 12/2008 | Kaji et al. | |
| 7,501,293 B2 | 3/2009 | Ito et al. | |
| 7,674,650 B2 | 3/2010 | Akimoto et al. | |
| 7,732,819 B2 | 6/2010 | Akimoto et al. | |
| 2001/0046027 A1 | 11/2001 | Tai et al. | |
| 2002/0024489 A1 | 2/2002 | Koyama et al. | |
| 2002/0056838 A1 | 5/2002 | Ogawa | |
| 2002/0132454 A1 | 9/2002 | Ohtsu et al. | |
| 2002/0167477 A1 | 11/2002 | Tsutsui et al. | |
| 2003/0189401 A1 | 10/2003 | Kido et al. | |
| 2003/0218222 A1 | 11/2003 | Wager et al. | |
| 2004/0038446 A1 | 2/2004 | Takeda et al. | |
| 2004/0127038 A1 | 7/2004 | Carcia et al. | |
| 2004/0252115 A1* | 12/2004 | Boireau | 345/211 |
| 2005/0017302 A1 | 1/2005 | Hoffman | |
| 2005/0140699 A1* | 6/2005 | Ito | 345/691 |
| 2005/0199959 A1 | 9/2005 | Chiang et al. | |
| 2005/0280621 A1 | 12/2005 | Tsutsui et al. | |
| 2006/0035452 A1 | 2/2006 | Carcia et al. | |
| 2006/0043377 A1 | 3/2006 | Hoffman et al. | |
| 2006/0091793 A1 | 5/2006 | Baude et al. | |
| 2006/0108529 A1 | 5/2006 | Saito et al. | |
| 2006/0108636 A1 | 5/2006 | Sano et al. | |
| 2006/0110867 A1 | 5/2006 | Yabuta et al. | |
| 2006/0113536 A1 | 6/2006 | Kumomi et al. | |
| 2006/0113539 A1 | 6/2006 | Sano et al. | |
| 2006/0113549 A1 | 6/2006 | Den et al. | |
| 2006/0113565 A1 | 6/2006 | Abe et al. | |
| 2006/0169973 A1 | 8/2006 | Isa et al. | |
| 2006/0170111 A1 | 8/2006 | Isa et al. | |
| 2006/0197092 A1 | 9/2006 | Hoffman et al. | |
| 2006/0208977 A1 | 9/2006 | Kimura | |
| 2006/0228974 A1 | 10/2006 | Thelss et al. | |
| 2006/0231882 A1 | 10/2006 | Kim et al. | |
| 2006/0238135 A1 | 10/2006 | Kimura | |
| 2006/0244107 A1 | 11/2006 | Sugihara et al. | |
| 2006/0284171 A1 | 12/2006 | Levy et al. | |
| 2006/0284172 A1 | 12/2006 | Ishii | |
| 2006/0292777 A1 | 12/2006 | Dunbar | |
| 2007/0024187 A1 | 2/2007 | Shin et al. | |
| 2007/0046191 A1 | 3/2007 | Saito | |
| 2007/0052025 A1 | 3/2007 | Yabuta | |
| 2007/0054507 A1 | 3/2007 | Kaji et al. | |
| 2007/0080909 A1* | 4/2007 | Jeon et al. | 345/77 |
| 2007/0090365 A1 | 4/2007 | Hayashi et al. | |
| 2007/0108446 A1 | 5/2007 | Akimoto | |
| 2007/0152217 A1 | 7/2007 | Lai et al. | |
| 2007/0172591 A1 | 7/2007 | Seo et al. | |
| 2007/0187678 A1 | 8/2007 | Hirao et al. | |
| 2007/0187760 A1 | 8/2007 | Furuta et al. | |
| 2007/0194379 A1 | 8/2007 | Hosono et al. | |
| 2007/0252928 A1 | 11/2007 | Ito et al. | |
| 2007/0272922 A1 | 11/2007 | Kim et al. | |
| 2007/0287296 A1 | 12/2007 | Chang | |
| 2008/0006877 A1 | 1/2008 | Mardilovich et al. | |
| 2008/0038882 A1 | 2/2008 | Takechi et al. | |
| 2008/0038929 A1 | 2/2008 | Chang | |
| 2008/0050595 A1 | 2/2008 | Nakagawara et al. | |
| 2008/0073653 A1 | 3/2008 | Iwasaki | |
| 2008/0083950 A1 | 4/2008 | Pan et al. | |
| 2008/0106191 A1 | 5/2008 | Kawase | |
| 2008/0128689 A1 | 6/2008 | Lee et al. | |
| 2008/0129195 A1 | 6/2008 | Ishizaki et al. | |
| 2008/0158217 A1 | 7/2008 | Hata et al. | |
| 2008/0166834 A1 | 7/2008 | Kim et al. | |
| 2008/0182358 A1 | 7/2008 | Cowdery-Corvan et al. | |
| 2008/0224133 A1 | 9/2008 | Park et al. | |
| 2008/0224904 A1* | 9/2008 | Fujimura | 341/63 |
| 2008/0254569 A1 | 10/2008 | Hoffman et al. | |
| 2008/0258139 A1 | 10/2008 | Ito et al. | |
| 2008/0258140 A1 | 10/2008 | Lee et al. | |
| 2008/0258141 A1 | 10/2008 | Park et al. | |
| 2008/0258143 A1 | 10/2008 | Kim et al. | |
| 2008/0296568 A1 | 12/2008 | Ryu et al. | |
| 2009/0058888 A1* | 3/2009 | Chou et al. | 345/690 |
| 2009/0068773 A1 | 3/2009 | Lai et al. | |
| 2009/0073325 A1 | 3/2009 | Kuwabara et al. | |
| 2009/0114910 A1 | 5/2009 | Chang | |
| 2009/0134399 A1 | 5/2009 | Sakakura et al. | |
| 2009/0152506 A1 | 6/2009 | Umeda et al. | |
| 2009/0152541 A1 | 6/2009 | Maekawa et al. | |
| 2009/0213042 A1* | 8/2009 | Hagino et al. | 345/55 |
| 2009/0278122 A1 | 11/2009 | Hosono et al. | |
| 2009/0280600 A1 | 11/2009 | Hosono et al. | |
| 2010/0033414 A1* | 2/2010 | Jeong et al. | 345/89 |
| 2010/0065844 A1 | 3/2010 | Tokunaga | |
| 2010/0066724 A1* | 3/2010 | Huh et al. | 345/213 |
| 2010/0092800 A1 | 4/2010 | Itagaki et al. | |
| 2010/0109002 A1 | 5/2010 | Itagaki et al. | |
| 2010/0123711 A1* | 5/2010 | Kawabe | 345/214 |
| 2010/0315396 A1* | 12/2010 | Weng et al. | 345/208 |
| 2011/0157131 A1 | 6/2011 | Miyake | |
| 2011/0205254 A1* | 8/2011 | Umezaki et al. | 345/690 |
| 2011/0285755 A1* | 11/2011 | Umezaki | 345/690 |
| 2012/0169954 A1* | 7/2012 | Liu | 349/38 |

FOREIGN PATENT DOCUMENTS

| | | |
|---|---|---|
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 07-239463 A | 9/1995 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-236465 A | 8/2002 |
| JP | 2002-289859 A | 10/2002 |
| JP | 2002-328655 A | 11/2002 |
| JP | 2003-086000 A | 3/2003 |
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2005-140959 A | 6/2005 |
| JP | 2008-181108 A | 8/2008 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.

(56) References Cited

OTHER PUBLICATIONS

Takahashi.M et al., "Theoretical Analysis of IGZO Transparent Amorphous Oxide Semiconductor,", IDW '08 : Poceedings of the 15th International Display Workshops, Dec. 3, 2008, pp. 1637-1640.

Hayashi.R et al., "42.1: Invited Paper: Improved Amorphous In-Ga-Zn-O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters), Jun. 17, 1996, vol. 68, No. 25, pp. 3650-3652.

Nakamura.M et al., "The phase relations in the In2O3-Ga2ZnO4-ZnO system at 1350°C.,", Journal of Solid State Chemistry, Aug. 1, 1991, vol. 93, No. 2, pp. 298-315.

Kimizuka.N et al., "Syntheses and Single-Crystal Data of Homologous Compounds, In2O3(ZnO)m (m=3, 4, and 5), InGaO3(ZnO)3, and Ga2O3(ZnO)m (m=7, 8, 9, and 16) in the In2O3-ZnGa2O4-ZnO System,", Journal of Solid State Chemistry, Apr. 1, 1995, vol. 116, No. 1, pp. 170-178.

Nomura.K et al., "Thin-Film Transistor Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In-Ga-Zn-Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters), Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Superspace Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3-In2O3-ZnO) TFT,", SID Digest '08 : SID International Symposium Digest of Technical Papers, May 20, 2008, vol. 39, pp. 633-636.

Lee.J et al., "World'S Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDs,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs,", IDW '02 : Proceedings of the 9th International Display Workshops, Dec. 4, 2002, pp. 295-298.

Van de Walle,C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In-Ga-Zn-O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium-Gallium-Zinc Oxide TFTs Array,", SID Digest '08 : SID International Symposium Digest of Technial Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits, 2008, vol. 43, No. 1, pp. 292-299.

Ohara.H et al., "Amorphous In-Ga-Zn-Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane,", SID Digest '09 : SID International Symposium Digest of Technical Papers, May 31, 2009, pp. 280-283.

Lee.M et al., "15.4:Excellent Performance of Indium-Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-In. AMOLED Display With Driver Circuit Using Amorphous In-Ga-Zn-Oxide TFTs,", IDW '09 : Proceedings of the 16th International Display Workshops, 2009, pp. 689-692.

Park.J et al., "Amorphous Indium-Gallium-Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by Peald Grown ZnO TFT,", IMID '07 Digest, 2007, pp. 1249-1252.

Godo.H et al., "Temperature Dependence of Characteristics and Electronic Structure for Amorphous In-Ga-Zn-Oxide TFT,", AM-FPD '09 Digest of Technical Papers, Jul. 1, 2009, pp. 41-44.

Osada.T et al., "Development of Driver-Integrated Panel Using Amorphous In-Ga-Zn-Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS,", Journal of The SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In-Ga-Zn-Oxide TFT,", SID Digest '09 : SID International Symposium Digest of Technical Papers, May 31, 2009, pp. 1110-1112.

Ohara.H et al., "21.3:4.0 In. QVGA AMOLED Display Using In-Ga-Zn-Oxide TFTs With a Novel Passivation Layer,", SID Digest '09 : SID International Symposium Digest of Technical Papers, May 31, 2009, pp. 284-287.

Miyasaka.M, "Suftla Flexible Microelectronics on their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1:Polarizer-Free Reflective LCD Combined With Ultra Low-Power Driving Technology,", SID Digest '09 : SID International Symposium Digest of Technical Papers, May 31, 2009, pp. 395-398.

(56) References Cited

OTHER PUBLICATIONS

Lee.H et al., "Current Status of, Challenges to, and Perspective View of AM-OLED ,", IDW '06 : Proceedings of the 13th International Display Workshops, Dec. 7, 2006, pp. 663-666.
Kikuchi.H et al., "62.2:Invited Paper:Fast Electro-Optical Switching in Polymer-Stabilized Liquid Crystalline Blue Phases for Display Application,", SID Digest '07 : SID International Digest of Technical Papers, 2007, vol. 38, pp. 1737-1740.
Nakamura, "Synthesis of Homologous Compound with New Long-Period Structure,", Nirim Newsletter, Mar. 1, 1995, vol. 150, pp. 1-4.
Kikuchi.H et al., "Polymer-Stabilized Liquid Crystal Blue Phases,", Nature Materials, Sep. 1, 2002, vol. 1, pp. 64-68.
Kimizuka.N. et al., "Spinel,YBFE2O4, and YB2FE3O7 Types of Structures for Compounds in the IN2O3 and SC2O3-A2O3-BO Systems [A; Fe, Ga, or Al; B: Mg, Mn, Fe, Ni, Cu, or Zn] at Temperatures Over 1000°C.", Journal of Solid State Chemistry, 1985, vol. 60, pp. 382-384.
Kitzerow.H et al., "Observation of Blue Phases in Chiral Networks,", Liquid Crystals, 1993, vol. 14, No. 3, pp. 911-916.
Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.
Meiboom.S et al., "Theory of the Blue Phase of Cholesteric Liquid Crystals,", Phys. Rev. Lett. (Physical Review Letters), May 4, 1981, vol. 46, No. 18, pp. 1216-1219.
Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.
Orita.M et al., "Mechanism of Electrical Conductivity of Transparent InGaZnO4,", Phys. Rev. B (Physical Review. B), Jan. 15, 2000, vol. 61, No. 3, pp. 1811-1816.
Nomura.K et al., "Amorphous OxideSemiconductors for High-Performance Flexible Thin-Film Transistors,", Jpn. J. Appl. Phys. (Japanese Journal of Applied Physics) , 2006, vol. 45, No. 5B, pp. 4303-4308.
Janotti.A et al., "Native Point Defects in ZnO,", Phys. Rev. B (Physical Review. B), 2007, vol. 76, pp. 165202-1-165202-22.
Park.J et al., "Electronic Transport Properties of Amorphous Indium-Gallium-Zinc Oxide Semiconductor Upon Exposure to Water,", Appl. Phys. Lett. (Applied Physics Letters) , 2008, vol. 92, pp. 072104-1-072104-3.
Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.
Janotti.A et al., "Oxygen Vacancies in ZnO,", Appl. Phys. Lett. (Applied Physics Letters) , 2005, vol. 87, pp. 122102-1-122102-3.
Oba.F et al., "Defect energetics in ZnO: A hybrid Hartree-Fock density functional study,", Phys. Rev. B (Physical Review. B), 2008, vol. 77, pp. 245202-1-245202-6.
Orita.M et al., "Amorphous transparent conductive oxide InGaO3(ZnO)m (m<4):a Zn4s conductor,", Philosophical Magazine, 2001, vol. 81, No. 5, pp. 501-515.
Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.
Mo.Y et al., "Amorphous Oxide TFT Backplanes for Large Size AMOLED Displays,", IDW '08 : Proceedings of the 6th International Display Workshops, Dec. 3, 2008, pp. 581-584.
Kim.S et al., "High-Performance oxide thin film transistors passivated by various gas plasmas,", 214th ECS Meeting, 2008, No. 2317.
Clark.S et al., "First Principles Methods Using CASTEP,", Zeitschrift fur Kristallographie, 2005, vol. 220, pp. 567-570.
Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.
Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.
Oh.M et al., "Improving the Gate Stability of ZnO Thin-Film Transistors with Aluminum Oxide Dielectric Layers,", J. Electrochem. Soc. (Journal of the Electrochemical Society), 2008, vol. 155, No. 12, pp. H1009-H1014.
Ueno.K et al., "Field-Effect Transistor on SrTiO3 with Sputtered Al2O3 Gate Insulator,", Appl. Phys. Lett. (Applied Physics Letters) , Sep. 1, 2003, vol. 83, No. 9, pp. 1755-1757.
International Search Report (Application No. PCT/JP2011/051677) Dated Apr. 26, 2011.
Written Opinion (Application No. PCT/JP2011/051677) Dated Apr. 26, 2011.

* cited by examiner

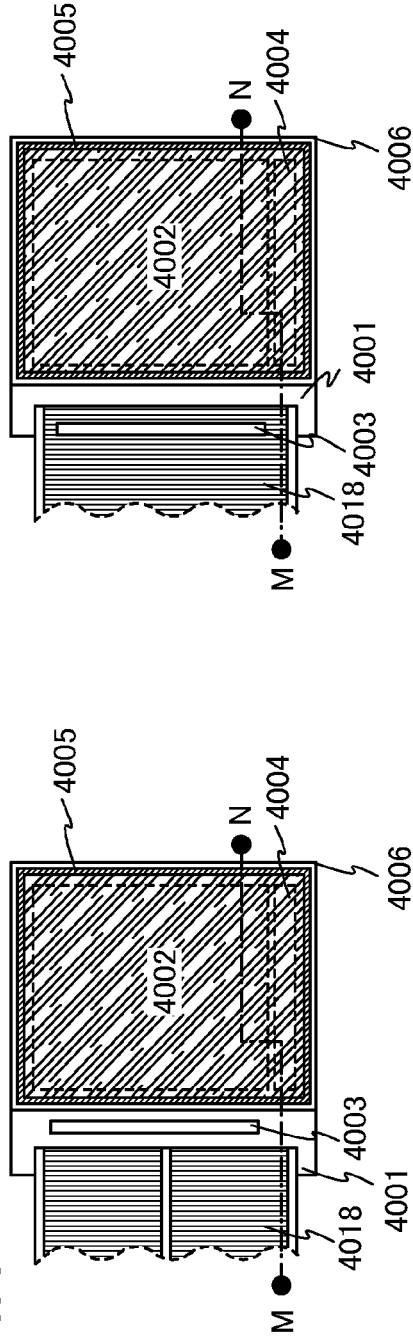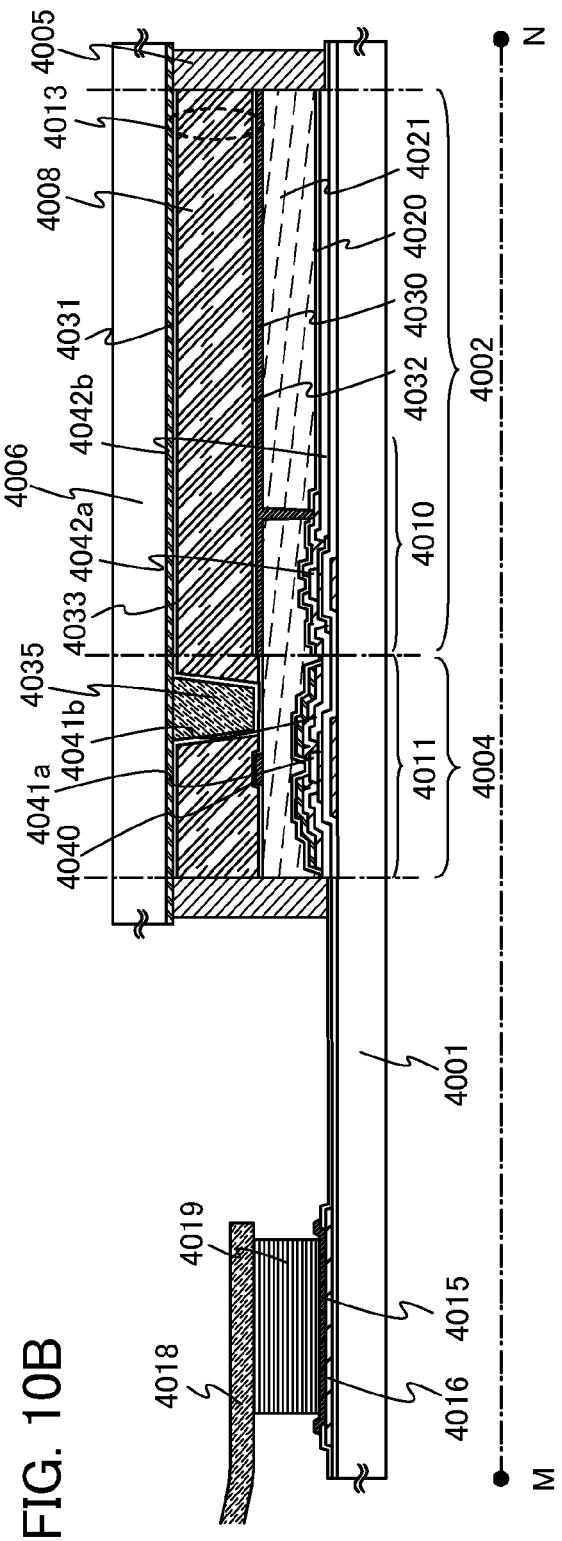

LIQUID CRYSTAL DISPLAY DEVICE AND ELECTRONIC DEVICE

TECHNICAL FIELD

The present invention relates to liquid crystal display devices. Alternatively, the present invention relates to a driving method of a liquid crystal display device. Alternatively, the present invention relates to electronic devices including the liquid crystal display devices.

BACKGROUND ART

Liquid crystal display devices ranging from a large display device such as a television receiver to a small display device such as a mobile phone have been spreading. Products with higher added values will be needed from now on and are being developed. In recent years, in view of rising interest in the global environment and improvement of the convenience of mobile devices, development of liquid crystal display devices with low power consumption has attracted attention.

Non-Patent Document 1 discloses a structure of a liquid crystal display device where refresh rates differ between the case of moving image display and the case of still image display for reduction in power consumption of the liquid crystal display device. Non-Patent Document 1 also discloses a structure where AC signals with the same phase are supplied to a signal line and a common electrode also in an idle period so that fluctuation in drain-common voltage can be prevented, in order that perception of flickers due to the fluctuation in drain-common voltage may be prevented, which is caused by switch of signals between the idle period and a scan period in the case of still image display.

REFERENCE

[Non-Patent Document 1] Kazuhiko Tsuda et al., IDW '02, pp. 295-298

DISCLOSURE OF INVENTION

As in Non-Patent Document 1, power consumption can be lowered by refresh rate reduction in displaying a still image. However, a voltage between a pixel electrode and a common electrode cannot be kept constant in some cases because the potential of the pixel electrode is changed by the off-state current of a pixel transistor and/or leakage current from a liquid crystal. As a result, a displayed image deteriorates because a voltage applied to the liquid crystals is changed and a desired gray level cannot be obtained.

Because a gray level is easily changed when multiple gray level display is performed, a refresh rate needs to be kept such that the gray level is not changed. Therefore, there is a problem in that power consumption of a liquid crystal display device cannot be sufficiently lowered by refresh rate reduction.

Thus, an object of one embodiment of the present invention is to suppress deterioration in image quality due to a change in gray level caused by refresh rate reduction in displaying a still image.

One embodiment of the present invention is a liquid crystal display device including a display portion controlled by a driver circuit and a timing controller for controlling the driver circuit. An image signal for displaying a still image is supplied to the timing controller. By the timing controller, a refresh rate in display of an image corresponding to the image signal on the display portion is reduced as a gray level of the image signal is smaller.

One embodiment of the present invention is a liquid crystal display device including a display portion controlled by a driver circuit and a timing controller for controlling the driver circuit. By the timing controller, a refresh rate in display of an image corresponding to a second image signal which has a second gray level number for displaying a still image on the display portion is made to be smaller than a refresh rate in display of an image corresponding to a first image signal which has a first gray level number which is smaller than the second gray level number.

One embodiment of the present invention may be a liquid crystal display device in which the timing controller includes an analyzing portion for judging a gray level number of the image signal, a lookup table portion storing a refresh rate in accordance with a signal from the analyzing portion, and a panel controller controlled by the lookup table portion.

One embodiment of the present invention may be the liquid crystal display device in which the analyzing portion includes a counter circuit provided for every bit of the image signal, and a determining portion judging a gray level value on the basis of a count value of the counter circuit.

One embodiment of the present invention may be the liquid crystal display device in which each pixel in the display portion includes a transistor for controlling writing of an image signal, and in which a semiconductor layer of the transistor includes an oxide semiconductor.

One embodiment of the present invention can achieve less deterioration in image quality which is due to a change in gray level caused by refresh rate reduction in displaying a still image. Further, power consumption can be lowered by refresh rate reduction in displaying a still image.

BRIEF DESCRIPTION OF DRAWINGS

FIGS. 10A1, 10A2, and 10B each illustrate a liquid crystal display device of one embodiment of the present invention.

BEST MODE FOR CARRYING OUT THE INVENTION

Figure 1A:
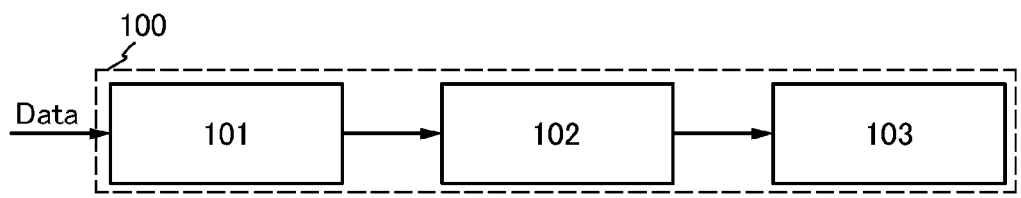
FIGS. 1A to 1C illustrate a liquid crystal display device in one embodiment of the present invention.

Hereinafter, embodiments of the present invention will be described with reference to the accompanying drawings. However, the present invention can be carried out in many different modes, and it is easily understood by those skilled in the art that modes and details of the present invention can be modified in various ways without departing from the purpose and the scope of the present invention. Therefore, the present invention should not be construed as being limited to the following description of the embodiments. Note that identical portions or portions having the same function in all drawings illustrating the structure of the invention that are described below are denoted by the same reference numerals.

Note that the size, the thickness of a layer, the waveform of a signal, and a region of components illustrated in the drawings and the like for the embodiments are exaggerated for simplicity in some cases. Therefore, embodiments of the present invention are not limited to such scales.

Note that in this specification, terms such as "first", "second", "third", and "N-th" (N is a natural number) are used in order to avoid confusion among components and do not limit the components numerically.

Embodiment 1

In this embodiment, a liquid crystal display device will be described with reference to a schematic diagram, a block diagram, and a diagram for illustrating the relation between characteristics of a liquid crystal element and a gray level number.

The liquid crystal display device relating to this specification will be described with reference to FIGS. 1A to 1C which are the simple block diagram of the liquid crystal display device and the schematic diagrams for illustrating a liquid crystal display device.

A liquid crystal display device 100 illustrated in FIG. 1A includes a timing controller (also referred to as a timing control circuit) 101, a driver circuit 102, and a display portion 103. The timing controller 101 is supplied with an image signal Data from the outside.

The timing controller 101 in FIG. 1A has a function of changing a refresh rate in accordance with a gray level number of the image signal Data (i.e., a gray level number of an image which is displayed with the image signal Data). Specifically, the timing controller 101 has a function of changing a holding period of an image signal written to a pixel included in the display portion.

The driver circuit 102 illustrated in FIG. 1A includes a gate line driver circuit (also referred to as a scan line driver circuit) and a source line driver circuit (also referred to as a signal line driver circuit). The gate line driver circuit and the source line driver circuit are driver circuits for driving the display portion 103 including a plurality of pixels, and include a shift register circuit (also referred to as a shift register) or a decoder circuit. Note that the gate line driver circuit and the source line driver circuit may be provided over the same substrate as the display portion 103 or a different substrate from the display portion 103.

The display portion 103 illustrated in FIG. 1A includes a plurality of pixels, a gate line (also referred to as a scan line) for scanning and selecting the plurality of pixels, and a source line (also referred to as a signal line) for supplying an image signal to the plurality of pixels. The gate line is controlled by the gate line driver circuit and the source line is controlled by the source line driver circuit. The pixel includes a transistor as a switching element, a capacitor, and a liquid crystal element.

Figure 1B:
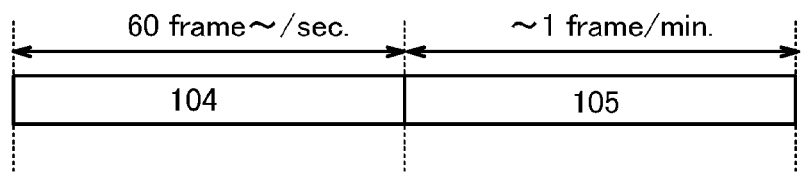

As illustrated in FIG. 1B, the liquid crystal display device 100 described in this embodiment has a moving image display period 104 and a still image display period 105. In a structure described in this embodiment, a writing period and a holding period of an image signal in each frame period in the still image display period 105 are particularly explained.

The cycle of one frame period (or frame frequency) is preferably less than or equal to 1/60 sec (60 Hz or more) in the moving image display period 104. The frame frequency is increased, so that flickering is hardly sensed by a viewer of an image. Further, the still image display period 105 preferably has an extremely long cycle of one frame period, for example, one minute or more (0.017 Hz or less). The reduction in frame frequency enables eyestrain to be less severe by comparison with the case where the same image is rewritten plural times. Note that the frame frequency means a refresh rate and means repetition times of screen display per second.

Note that the moving image display period 104 and the still image display period 105 may be switched in the following manner, for example: a signal for switching the periods are supplied from the outside, or the moving image display period 104 or the still image display period 105 is determined in accordance with the image signal Data. Note that in the case where the moving image display period 104 and the still image display period 105 are switched by determination to switch the periods in accordance with the image signal Data, the timing controller 101 in FIG. 1A switches the following periods: a moving image display period in which a moving image can be displayed by successive writing of an image signal which is performed whenever an image signal written to each pixel of the display portion 103 is different form an image signal written in the previous period, and a still image display period in which when the image signal written to each pixel of the display portion 103 is the same as that written in the previous period, a still image is displayed in such a manner that writing of the image signal is stopped and the written image signal is held in each pixel.

Then, operation of the timing controller 101 in FIG. 1A will be described with reference to the schematic diagram of FIG. 1C. Here, a plurality of image signals which is a first image signal and a second image signal are used as the specific image signals. Note that in FIG. 1C, the first image signal is an image signal having a first gray level number, specifically M grayscale (M is a natural number), a period T1 is a period for displaying an image with the first image signal, the second image signal is an image signal having a second gray level number, specifically N grayscale (N is a natural number), and a period T2 is a period for displaying an image with the second image signal. The first gray level number M is larger than the second gray level number N; that is, an image having more gray levels can be displayed with the first image signal than the second image signal. A period 106 which is one frame period in the period T1 in FIG. 1C is one frame period of the first image signal. A period 107 which is one frame period in the period T2 in FIG. 1C is one frame period of the second image signal. Note that the following description will be made on assumption that the first gray level number M is larger than the second gray level number N (M>N).

The gray level number is a number which indicates the brightness or darkness of colors, and the gray level is expressed by level of voltage (hereinafter, voltage level) of an image signal written to a pixel for displaying an image. Specifically, the gray level number is the total number of voltage levels that can be obtained by division of the slope of the voltage level which represents a change from white to black expressed by application of voltage to a liquid crystal element, into a plurality of levels. In addition, the gray level number is the number of voltage levels which are actually supplied to a pixel for displaying an image in one frame period, among the number of voltage levels which can be obtained by division of the slope of the voltage level which represents a change from white to black expressed by application of voltage to the liquid crystal element, into a plurality of levels. Specifically, the number of voltage levels which are actually supplied to a pixel for displaying image is expressed as it is as a gray level number. Note that a plurality of image signals is a plurality of image signals having different gray level numbers, such as the first image signal and the second image signal which are described above.

A structure described in this embodiment is a structure in which a refresh rate is changed in accordance with a gray level of an image displayed with an image signal particularly in a still image display period; in other words, the length of one frame period is changed. As illustrated in FIG. 1C, a refresh rate is changed in accordance with image signals which have different gray levels from each other; that is, the lengths of the period 106 and the period 107 are made to be different. The period 107 in which an image signal with the second gray level number N is used is designed to be longer than the period 106 in which an image signal with the first gray level number M is used; in other words, a refresh rate of an image signal with the first gray level number M is made to be smaller than that of an image signal with the second gray level number N. Also, the reduction in refresh rate corresponds to an increase in length of one frame period. Note that in FIG. 1C, the period 106 includes a period 108 in which the first image signal is written to a pixel (denoted by "W" in FIG. 1C) and a period 109 in which the first image signal is held in the pixel (denoted by "H" in FIG. 1C). The period 107 includes a period 110 in which the second image signal is written to a pixel (denoted by "W" in FIG. 1C) and a period 111 in which the second image signal is held in the pixel (denoted by "H" in FIG. 1C). Here, the lengths of the period 106 and the period 107 are different from each other, which means that the length of the period 109 for holding the first image signal in the pixel and the length of the period 111 for holding the second image signal in the pixel are different from each other. The lengths of the period 106 and the period 107 are changed in accordance with the first gray level number M and the second gray level number N, so that deterioration in image quality which is due to a change in gray level caused by refresh rate reduction in displaying a still image can be suppressed. In addition, writing frequency of image signals is decreased by refresh rate reduction in displaying a still image, so that lower power consumption can be realized. In the case where a still image is displayed by rewriting the same image plural times, visible switching of the images may cause eyestrain of the human eye. Therefore, drastic refresh rate reduction can make eyestrain less severe.

Figure 1C:
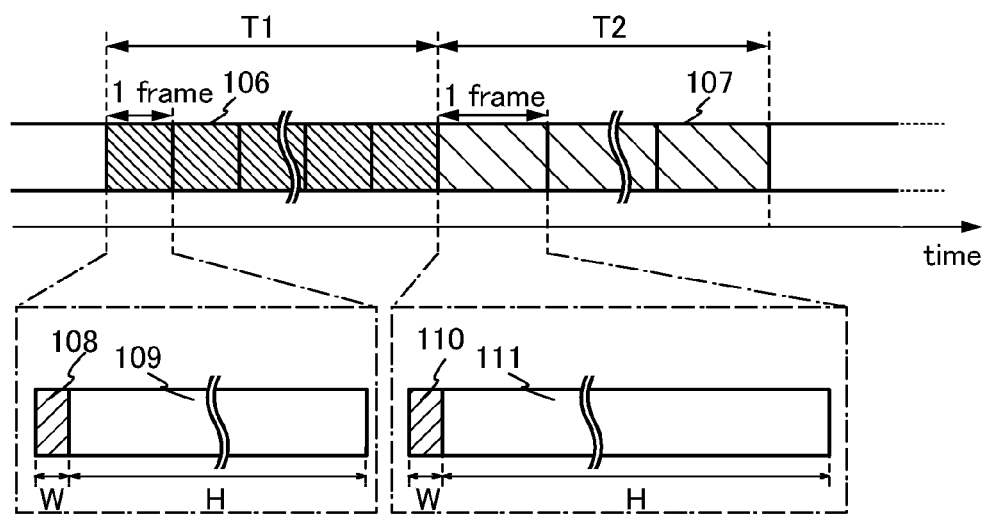
Figure 2A:
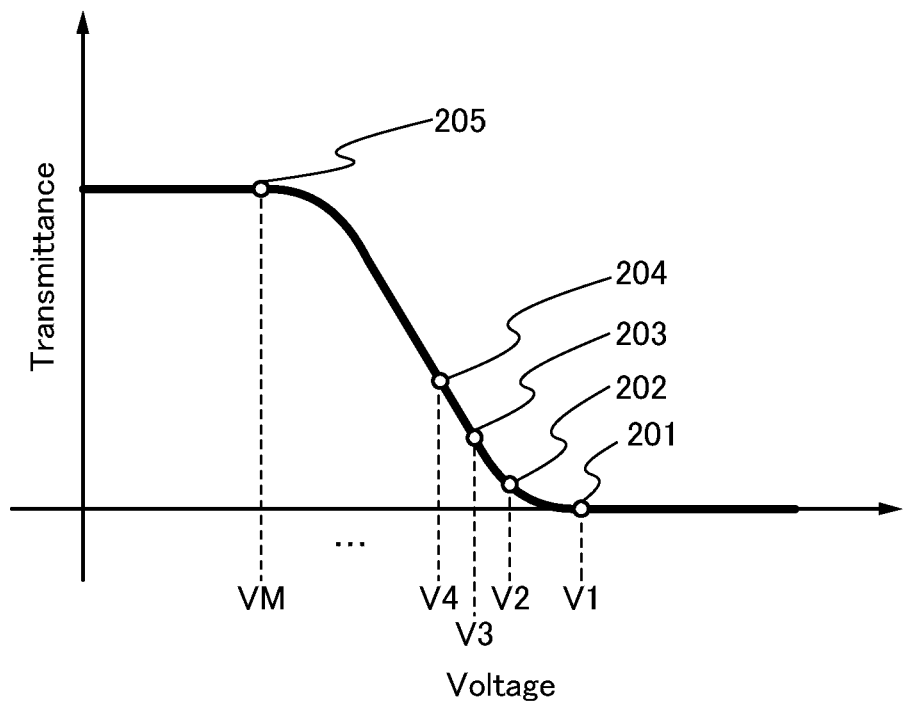
FIGS. 2A and 2B illustrate a liquid crystal display device in one embodiment of the present invention.
Figure 2B:
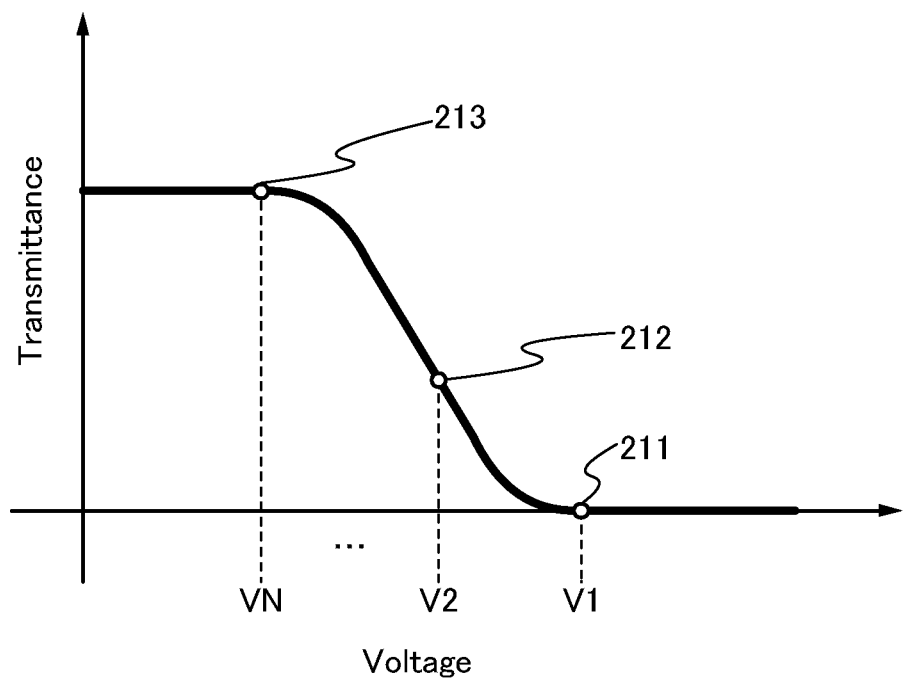

Then, for explaining the effect achieved by the structure of this embodiment, FIGS. 2A and 2B illustrate the relation between the transmittance of the liquid crystal element and the voltage of an image signal corresponding to the first gray level number M, and the second gray level number N in FIG. 1C, respectively, as an example. Note that FIGS. 2A and 2B illustrate the transmittance of a normally white mode liquid crystal element, whose transmittance is high when 0 [V] is applied, as an example. Note that the structure of this embodiment can achieve the same effect even if a normally black mode liquid crystal element is used. In addition, in order to drive a liquid crystal element, a variety of inversion driving in which whether the polarity of voltage applied to the liquid crystal element is inverted or not can be selected may be employed. Note that although the relation between positive voltage and transmittance is described in this embodiment, the relation is similar when the polarity of voltage is negative.

FIG. 2A illustrates the relation between voltage and transmittance when an image signal has the first gray level number M. FIG. 2B illustrates the relation between voltage and transmittance when an image signal has the second gray level number N.

In FIG. 2A, in the first gray level number M, a voltage V1 corresponds to a first gray level 201 (black), a voltage V2 corresponds to a second gray level 202 (intermediate level), a voltage V3 corresponds to a third gray level 203 (intermediate level), a voltage V4 corresponds to a fourth gray level 204 (intermediate level), and a voltage VM corresponds to a M-th gray level 205 (white). In FIG. 2B, in the second gray level number N, a voltage V1 corresponds to a first gray level 211 (black), a voltage V2 corresponds to a second gray level 212 (intermediate level), and a voltage VN corresponds to an N-th gray level 215 (white). Note that the voltages are applied to opposite electrodes of a liquid crystal element. As illustrated in FIG. 2A and FIG. 2B, in comparing the first gray level number M and the second gray level number N, the second gray level number N which is a smaller number of gray levels of image signals has a larger gap (difference) of voltages between gray levels. Therefore, as the gray level number of the image signal becomes smaller, a gray level is hardly changed even when a voltage of an image signal written to a pixel is changed over time.

Figure 3A:
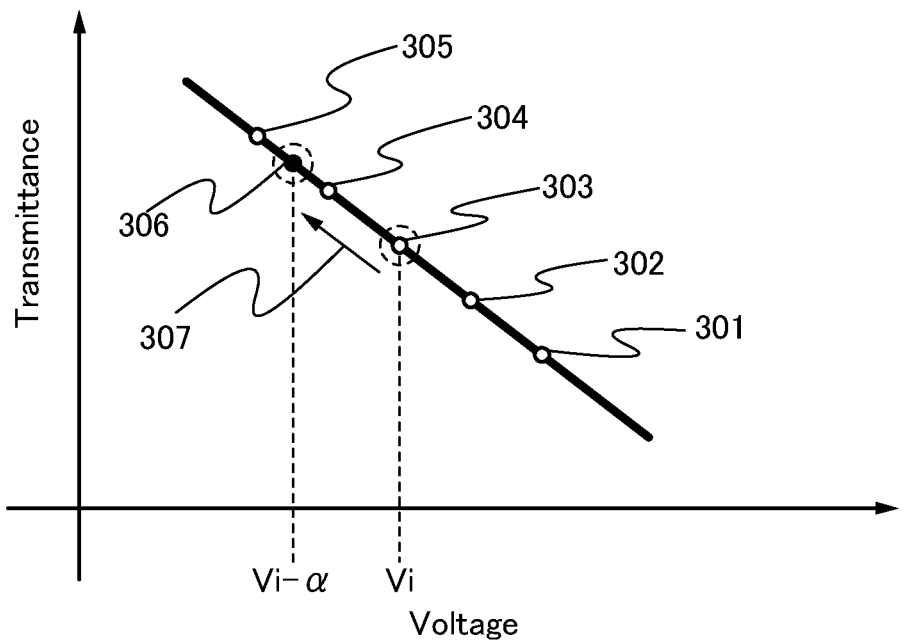
FIGS. 3A and 3B illustrate a liquid crystal display device in one embodiment of the present invention.
Figure 3B:
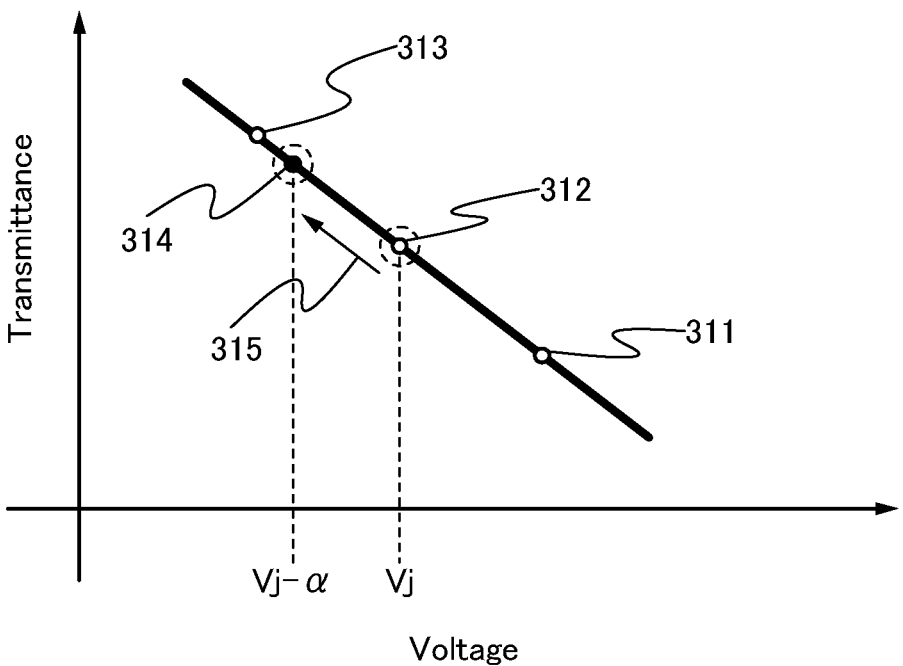

In FIGS. 3A and 3B, the relation illustrated between voltage and transmittance in FIGS. 2A and 2B is illustrated more specifically. FIG. 3A illustrates the relation between voltage and transmittance of around an i-th gray level (i is any one of 1 to M) which is an intermediate level illustrated in FIG. 2A. FIG. 3B illustrates the relation between voltage and transmittance of around a j-th gray level (j is any one of 1 to N) which is an intermediate level illustrated in FIG. 2B. For example, when the image signal has the first gray level number M in FIG. 3A, a voltage $V_i$ corresponds to an i-th gray level 303 (intermediate level), a voltage $V_{i+1}$ corresponds to an (i+1)-th gray level 304 (intermediate level), a voltage $V_{i+2}$ corresponds to an (i+2)-th gray level 305 (intermediate level), a voltage $V_{i-1}$ corresponds to an (i−1)-th gray level 302 (intermediate level), and a voltage $V_{i-2}$ corresponds to an (i−2)-th gray level 301 (intermediate level). When the image signal has the second gray level number N in FIG. 3B, a voltage $V_j$ corresponds to a j-th gray level 312 (intermediate level), a voltage $V_{j+1}$ corresponds to a (j+1)-th gray level 313 (intermediate level), and a voltage $V_{j-1}$ corresponds to a (j−1)-th gray level 311 (intermediate level).

In FIG. 3A, the voltage $V_i$ is applied to the liquid crystal element to express the i-th gray level 303. In FIG. 3B, the voltage $V_j$ is applied to the liquid crystal element to express the j-th gray level 312. It is assumed that after application of the voltage $V_i$ and the voltage $V_j$, the voltage applied to the liquid crystal element is decreased over time by α, thereby becoming a voltage $V_{i-\alpha}$ and a voltage $V_{j-\alpha}$, respectively. In FIG. 3A, a decrease from the voltage $V_i$ to the voltage $V_{i-\alpha}$ means that a gray level shifts to a gray level 306 which is between the (i+1)-th gray level 304 (intermediate level) and the (i+2)-th gray level 305 (see an arrow 307 in FIG. 3A); consequently, the gray level is recognized as the (i+1)-th gray level 304 (intermediate level) or the (i+2)-th gray level 305 because of a decrease in voltage. In FIG. 3B, a decrease from the voltage $V_j$ to the voltage $V_{j-\alpha}$ means that a gray level shifts to a gray level 314 which is between the j-th gray level 312 and the (j+1)-th gray level 313 (see an arrow 315 in FIG. 3B); consequently, the gray level is recognized as the j-th gray level 312 or the (j+1)-th gray level 313 because of a decrease in voltage. It is found from FIGS. 3A and 3B that although the voltage $V_i$ and the voltage $V_j$ applied to the liquid crystal element are decreased by the same value of α, a change of gray level which is due to a change in voltage is smaller in the image signal having the second gray level number N (FIG. 3B) than in the image signal having the first gray level number M (FIG. 3A). In other words, when voltage is decreased while an image signal written to the pixel is held, deterioration in image quality due to a change in gray level can be reduced with the image signal having the second gray level number N which is a small number, by comparison with the case of the image signal having the first gray level number M which is a large number. Therefore, in the case where an image is displayed in accordance with the image signal having the second gray level number N which is a small number, even if the refresh rate is small, deterioration in image quality which is due to a change in gray level in displaying a still image can be reduced, by comparison with the case where an image is displayed in accordance with the image signal having the first gray level number M which is a large number. Further, when the image is displayed in accordance with the image signal having the second gray level number N which is a small number, a period for holding the image signal can be set longer than that in the case where the image is displayed in accordance with the image signal having the first gray level number M which is a large number. Thus, lower power consumption can be achieved by a reduction in refresh rate in displaying a still image.

Note that the timing controller of this embodiment may have a function of changing a refresh rate by analyzing each bit value for expressing the gray level of the digital image signal Data instead of a function of changing a refresh rate in accordance with the gray level of the image signal Data. As a specific example, FIGS. 4A and 4B illustrate a structure of changing a refresh rate by analyzing bit values.

Figure 4A:
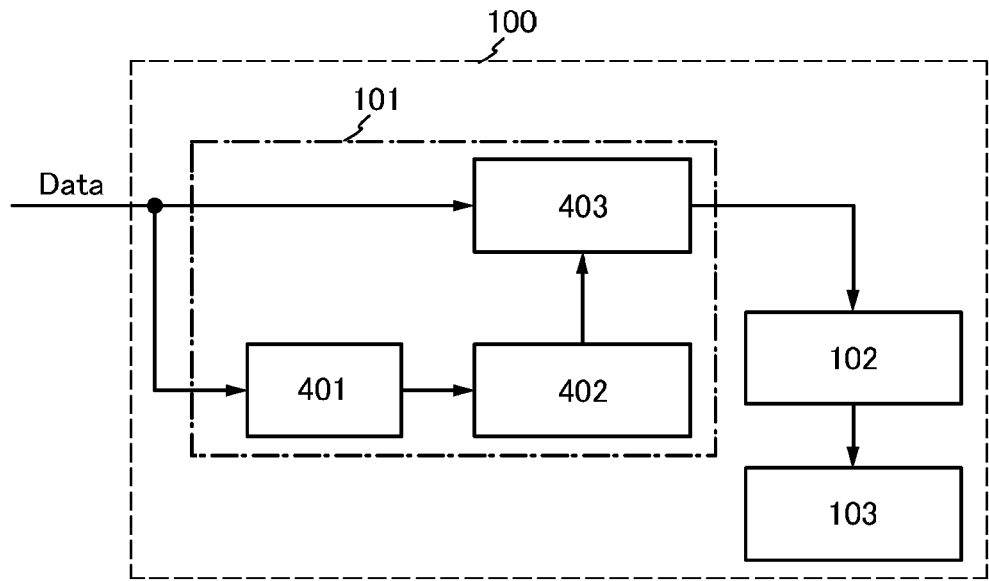
FIGS. 4A and 4B illustrate a liquid crystal display device in one embodiment of the present invention.

FIG. 4A is a block diagram illustrating the timing controller in the block diagram FIG. 1A in detail. The timing controller 101 in FIG. 4A includes an analyzing portion 401, a lookup table portion 402, and a panel controller (also referred to as a display control circuit) 403. The analyzing portion 401 in FIG. 4A reads a bit value of each of n (n is a natural number) bits of the image signal Data, analyzes whether bit values are the same in all pixels or not and/or whether some bit values are the same in all pixels or not, and outputs the result of the analysis to the lookup table portion 402. The lookup table portion 402 stores a lookup table for realizing the refresh rate based on the result of the analysis, and controls the panel controller 403 on the basis of the signal in accordance with the lookup table.

Figure 4B:
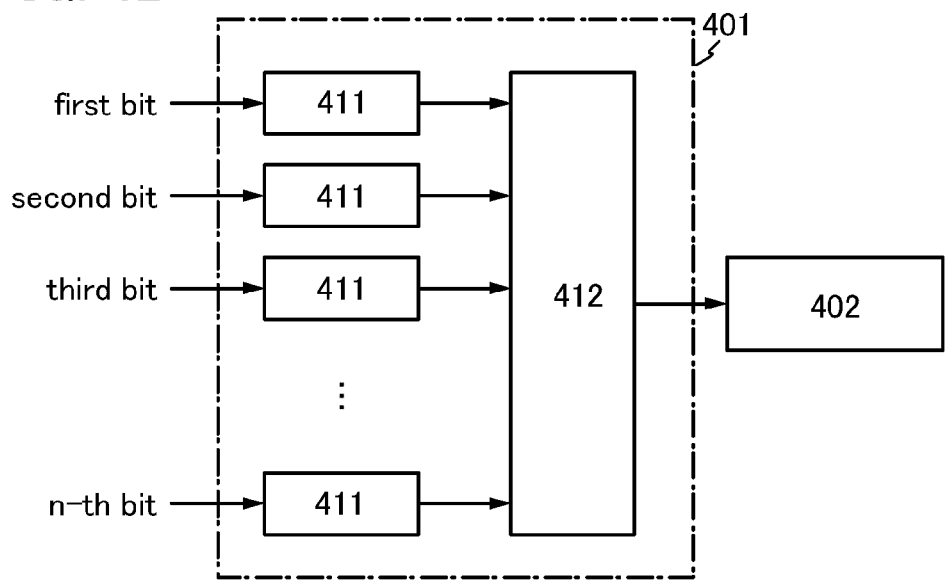

FIG. 4B illustrates a structure of the analyzing portion 401. The analyzing portion 401 in FIG. 4B includes a plurality of counter circuits 411 and a determining portion 412. The counter circuit 411 is provided for each bit, and is a circuit which counts by changing a count value in accordance with an bit value of the inputted image signal Data. A specific operation is as follows, for example: when a count value is changed in at least any one of the plurality of counter circuits 411, bit values are not the same in all pixels; the determining portion 412 judges whether a count value is changed by the counter circuits 411 or not and outputs the result to the lookup table portion 402.

Here, a 6-bits image signal is considered in order to explain an example of a specific operation of the timing controller 101 illustrated in FIGS. 4A and 4B. The gray level of an image signal supplied to each pixel is expressed by a binary as follows: a zeroth gray level is "000000", a first gray level is "000001", a second gray level is "000010", a third gray level is "000011", a fourth gray level is "000100", a fifth gray level is "000101", a sixth gray level is "000110", a seventh gray level is "000111", and an eighth gray level is "001000". At this time, if the least significant bit of the first image signal in the period 106, which is one frame period in the period T1 in FIG. 1C, is the same in all pixels, a grayscale shift, which is caused by a decrease in voltage applied to the liquid crystal element, of at least two gray levels is allowed. Further, if the lower two bits of the second image signal in the period 107, which is one frame period in the period T2 in FIG. 1C, is the same in all pixels, a grayscale shift, which is caused by a decrease in voltage applied to the liquid crystal element, of at least four gray levels is allowed. In other words, in the case where the lower two bits are the same in all pixels, by comparison with the case where the least significant bit is the same in all pixels, a grayscale shift which is caused by a decrease in voltage applied to the liquid crystal element as illustrated in FIGS. 3A and 3B is small; therefore, a refresh rate can be reduced.

As described above, in a period for displaying a still image in the structure of this embodiment, deterioration in image quality which is due to a change in gray level can be small in advance by reduction in refresh rate. Further, lower power consumption can be realized by refresh rate reduction in displaying a still image.

This embodiment can be implemented in appropriate combination with the structures described in the other embodiments.

Embodiment 2

In this embodiment, a liquid crystal display device of the present invention and one mode of a liquid crystal display device which can achieve low power consumption will be described with reference to FIG. 5, FIG. 6, FIGS. 7A and 7B, and FIG. 8.

Figure 5:
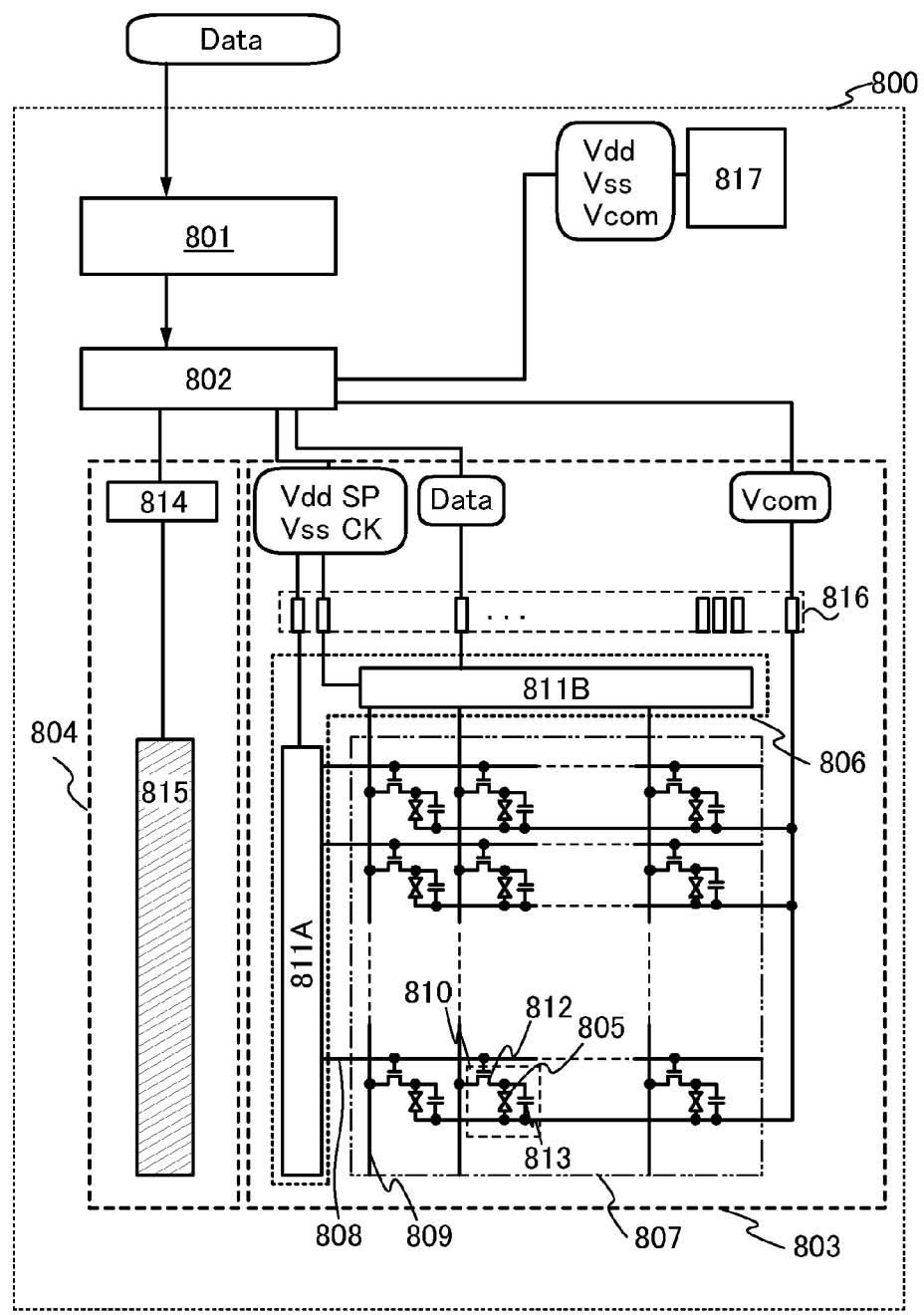
FIG. 5 illustrates a liquid crystal display device in one embodiment of the present invention.

A block diagram of FIG. 5 illustrates a structure of a liquid crystal display device 800 described in this embodiment. The liquid crystal display device 800 includes an image process circuit 801, a timing controller 802, and a display panel 803. In the case of a transmissive liquid crystal display device or a transflective liquid crystal display device, a backlight portion 804 is additionally provided as a light source.

The liquid crystal display device 800 is supplied with the image signal (the image signal Data) from an external device connected thereto. Note that power supply potentials (a high power supply potential Vdd, a low power supply potential Vss, and a common potential Vcom) are supplied when a power source 817 of the liquid crystal display device is turned on to start the supply of electric power supply. Control signals (a start pulse SP and a clock signal CK) are supplied from the timing controller 802.

Note that the high power supply potential Vdd is a potential higher than a reference potential, and the low power supply potential Vss is a potential lower than or equal to the reference potential. Note that both the high power supply potential Vdd and the low power supply potential Vss are preferably potentials with which a thin film transistor can operate. Note that the high power supply potential Vdd and the low power supply potential Vss are collectively referred to as a power supply voltage in some cases.

The common potential Vcom may be any potential as long as it serves as reference with respect to the potential of an image signal supplied to one of electrodes (pixel electrode) of a liquid crystal element 805. For example, the common potential Vcom may be a ground potential.

The image signal Data may be appropriately inverted in accordance with dot inversion driving, source line inversion driving, gate line inversion driving, frame inversion driving, or the like to be input to the liquid crystal display device 800. In the case where the image signal is an analog signal, the image signal may be converted into a digital signal through an A/D converter or the like to be supplied to the liquid crystal display device 800.

In this embodiment, the other of electrodes (counter electrode) of the liquid crystal element 805 and one electrode of a capacitor 813 are supplied with the common potential Vcom that is a fixed potential through the timing controller 802 from the power source 817.

The image process circuit 801 performs analysis, operation, and/or processing on the image signal Data that has been input thereto, and outputs the processed image signal Data together with a judgment signal to the timing controller 802.

Specifically, the image process circuit 801 analyzes the inputted image signal Data, judges whether the image to be displayed is a moving image or a still image, and outputs a judgment signal including the result of judging to the timing controller 802. In the case of a still image, the image process circuit 801 takes out data of a still image for one frame from the image signal Data including data of a moving image or a still image, and outputs the data to the timing controller 802 together with a judgment signal representing a still image. Further, in the case of a moving image, the image process circuit 801 outputs the inputted image signal Data to the timing controller 802 together with a judgment signal representing a moving image. Note that the above function is an example of a function of the image process circuit 801, and a variety of image process functions can be selected and applied in accordance with applications of the display device.

The timing controller 802 has a function of supplying the processed image signal Data, the control signal (specifically, a signal for controlling switching between supply and stop of the control signal such as the start pulse SP and the clock signal CK), and the power source potential (the high power source potential Vdd, the low power source potential Vss, and the common potential Vcom) to the display panel 803, in addition to the function described in Embodiment 1.

Note that because an image signal converted into a digital signal is easily subjected to an operation such as detecting a difference in the image signal, an AD converter or the like may be provided in the image process circuit 801 when the inputted image signal (image signal Data) is an analog signal.

The display panel 803 has a structure in which a liquid crystal element 805 is sandwiched between a pair of substrate (a first substrate and a second substrate). The first substrate includes a driver circuit portion 806 and a pixel portion 807. The second substrate includes a common connection portion (also referred to as a common contact) and a common electrode (also referred to as a counter electrode). The common connection portion electrically connects a first substrate and a second substrate. The common connection portion may be provided over the first substrate.

In the pixel portion 807, a plurality of gate lines (scan lines) 808 and a plurality of source lines (signal lines) 809 are provided. A plurality of pixels 810 is arranged in matrix so that each of pixels 810 is surrounded by the gate lines 808 and the source lines 809. In the display panel described in this embodiment, the gate line 808 and the source line 809 are extended from a gate line driver circuit 811A and a source line driver circuit 811B, respectively.

In addition, the pixel 810 includes a transistor 812 as a switching element, the capacitor 813 connected to the transistor 812, and the liquid crystal element 805.

The liquid crystal element 805 is an element that controls transmission and non-transmission of light by the optical modulation action of liquid crystals. The optical modulation action of liquid crystals is controlled by electric field applied to the liquid crystals. The direction of the electric field applied to the liquid crystals varies according to a liquid crystal material, a driving method, and an electrode structure and is selected as appropriate. For example, in the case where a driving method in which electric field is applied in a thickness direction (a so-called vertical direction) of liquid crystals is used, the pixel electrode and the common electrode may be provided in the first substrate and the second substrate, respectively, with the liquid crystals provided between the first substrate and the second substrate. In the case where a driving method in which electric field is applied in a substrate surface direction (a so-called horizontal direction) is used, the pixel electrode and the common electrode may be provided over the same substrate with respect to the liquid crystals. The pixel electrode and the common electrode may have a variety of opening patterns. In this embodiment, there is no particular limitation on a liquid crystal material, a driving method, and an electrode structure as long as an element controls transmission and non-transmission of light by the optical modulation action.

In the transistor 812, one of the plurality of gate lines 808 provided in the pixel portion 807 is connected to the gate electrode, one of a source electrode and a drain electrode is connected to one of the plurality of source lines 809, and the other of the source electrode and the drain electrode is connected to one of the electrodes of the capacitor 813 and one of the electrodes of the liquid crystal element 805 (pixel electrode).

A transistor whose off-state current is low is preferably used for the transistor 812. When the transistor 812 is in the off state, electric charges accumulated in the liquid crystal element 805 and the capacitor 813 which are connected to the transistor 812 whose low off-state current is low are hardly leaked through the transistor 812, so that the state where data is written before the transistor 812 is turned off can be stably maintained until a next signal is written. Therefore, the pixel 810 can be formed without using the capacitor 813 connected to the transistor 812 whose off-state current is low.

With such a structure, the capacitor 813 can keep voltage applied to the liquid crystal element 805. The electrode of the capacitor 813 may be connected to a capacitor line additionally provided.

The driver circuit portion 806 includes the gate line driver circuit 811A and the source line driver circuit 811B. The gate line driver circuit 811A and the source line driver circuit 811B are driver circuits for driving the pixel portion 807 that includes the plurality of pixels and each include a shift register circuit (also referred to as a shift register).

Note that the gate line driver circuit 811A and the source line driver circuit 811B may be formed over the same substrate as the pixel portion 807 or over a different substrate from the pixel portion 807.

Note that the high power source potential Vdd, the low power source potential Vss, the start pulse SP, the clock signal CK, and the image signal Data which are controlled by the timing controller 802 are supplied to the driver circuit portion 806.

A terminal portion 816 is an input terminal which supplies a predetermined signal output from the timing controller 802 (such as the high power source potential Vdd, the low power source potential Vss, the start pulse SP, the clock signal CK, the image signal Data, and the common potential Vcom) and the like, to the driver circuit portion 806.

The liquid crystal display device may include a photometric circuit. The liquid crystal display device provided with the photometric circuit can detect the brightness of the environment where the liquid crystal display device is put. As a result, the timing controller 802 connected to the photometric circuit can control a driving method of a light source such as a backlight and a sidelight in accordance with a signal input from the photometric circuit.

The backlight portion 804 includes a backlight control circuit 814 and a backlight 815. The backlight 815 may be selected and combined in accordance with a use of the liquid crystal display device 800. As a light source of the backlight 815, a light-emitting diode (LED) can be used. For example, white light-emitting element (e.g., LED) may be arranged in the backlight 815. A backlight signal for controlling the backlight and the power source potential are supplied from the timing controller 802 to the backlight control circuit 814.

Color display may be performed by a combination with a color filter. Alternatively, color display may be performed by a combination with an optical film (such as a polarizing film, a retardation film, or an anti-reflection film). A light source such as a backlight that is used in a transmissive liquid crystal display device or a transflective liquid crystal display device may be selected and combined in accordance with the use of the liquid crystal display device 800. Further alternatively, a planar light source may be formed using a plurality of LED light sources or a plurality of electroluminescent (EL) light sources. As the planar light source, three or more kinds of LEDs may be used and an LED emitting white light may be used. Note that the color filter is not always provided in the case where light-emitting diodes of RGB or the like are arranged in a backlight and a successive additive color mixing method (a field sequential method) in which color display is performed by time division is employed.

Figure 6:
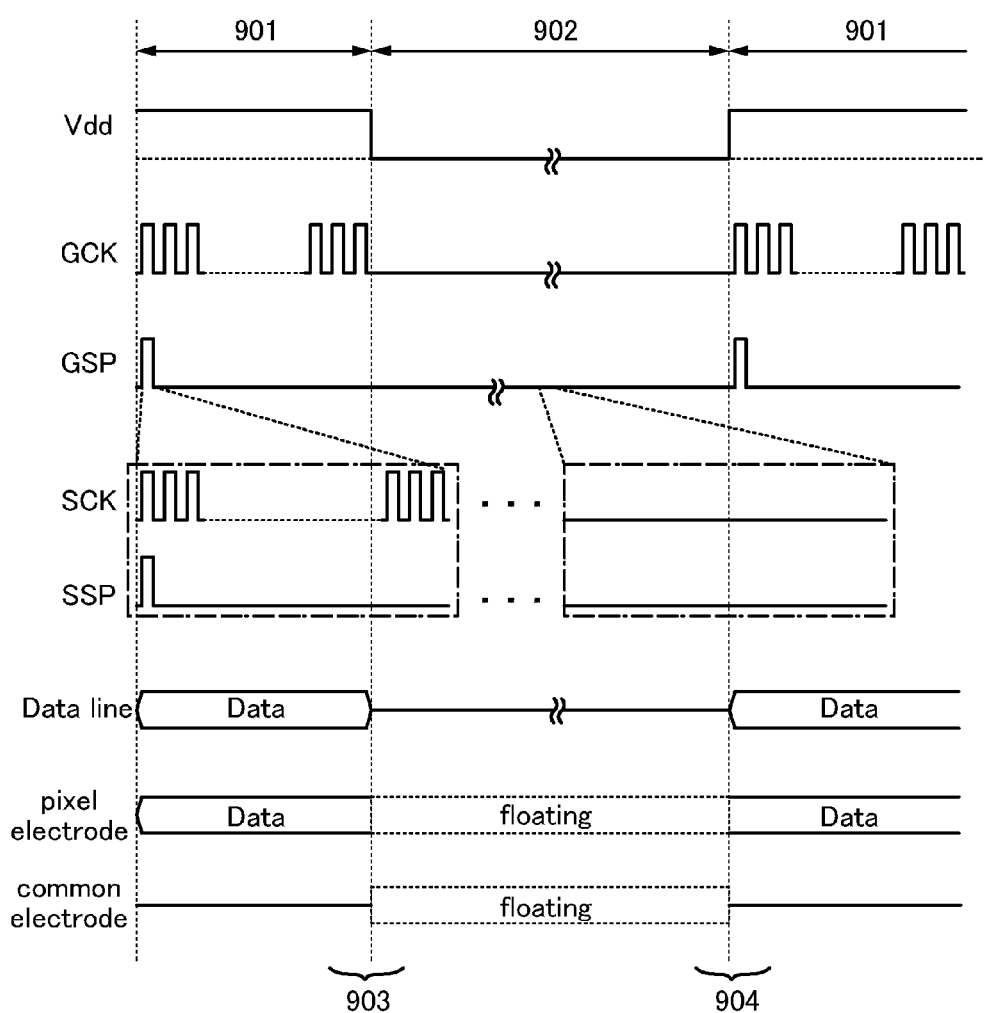
FIG. 6 illustrates a liquid crystal display device in one embodiment of the present invention.

Next, the state of signals supplied to the pixels will be described with reference to FIG. 5 illustrating a circuit diagram of pixels and FIG. 6 illustrating a timing chart.

In FIG. 6, a clock signal GCK and a start pulse GSP which are supplied from the timing controller 802 to the gate line driver circuit 811A are illustrated. In addition, in FIG. 6, a clock signal SCK and a start pulse SSP which are supplied from the timing controller 802 to the source line driver circuit 811B are illustrated. To describe an output timing of the clock signal, the waveform of the clock signal is indicated with simple rectangular wave in FIG. 6.

In FIG. 6, a potential of the source line 809 (Data line), the potential of a pixel electrode, and the potential of a common electrode are illustrated.

In FIG. 6, a period 901 corresponds to a period during which image signals for displaying a moving image are written. In the period 901, operation is performed so that the image signals and the common potential are supplied to the pixels in the pixel portion 807 and the common electrode.

A period 902 corresponds to a period during which a still image is displayed. In the period 902, the supply of the image signals to the pixels in the pixel portion 807 and the supply of the common potential to the common electrode are stopped. Note that each signal is supplied in the period 902 illustrated in FIG. 6 so that operation of the driver circuit portion is stopped, and it is preferable to prevent deterioration in image quality by writing image signals periodically in accordance with the length of the period 902 and a refresh rate. With the refresh rate described in Embodiment 1, deterioration in image quality which is due to a change in gray level can be reduced.

First, a timing chart in the period 901 will be described. In the period 901, a clock signal is supplied all the time as the clock signal GCK, and a pulse in accordance with a vertical synchronizing frequency is supplied as the start pulse GSP. In the period 901, a clock signal is supplied all the time as the clock signal SCK, and a pulse in accordance with one gate selection period is supplied as the start pulse SSP.

The image signal Data is supplied to pixels in each row through the source line 809, and the potential of the source line 809 is supplied to the pixel electrode in accordance with the potential of the gate line 808.

On the other hand, the period 902 is a period during which a still image is displayed. Next, a timing chart in the period 902 is described. In the period 902, supplies of the clock signal GCK, the start pulse GSP, the clock signal SCK, and the start pulse SSP are all stopped. In addition, the supply of the image signal Data to the source line 809 is stopped in the period 902. In the period 902 during which supplies of the clock signal GCK and the start pulse GSP are stopped, the transistor 812 is turned off and the potential of the pixel electrode is put in the floating state.

In the period 902, both electrodes of the liquid crystal element 805, that is, the pixel electrode and the common electrode, is put in the floating state; thus, a still image can be displayed without the supply of another potential.

The supplies of the clock signal and the start pulse to the gate line driver circuit 811A and the source line driver circuit 811B are stopped, whereby low power consumption can be achieved.

In particular, when a transistor whose low off-state current is low are used for the transistor 812, a decrease over time of the voltage applied to both terminals of the liquid crystal element 805 can be suppressed.

Figure 7A:
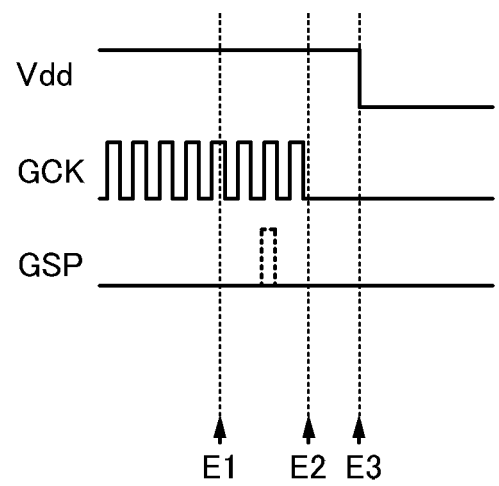
FIGS. 7A and 7B illustrate a liquid crystal display device in one embodiment of the present invention.
Figure 7B:
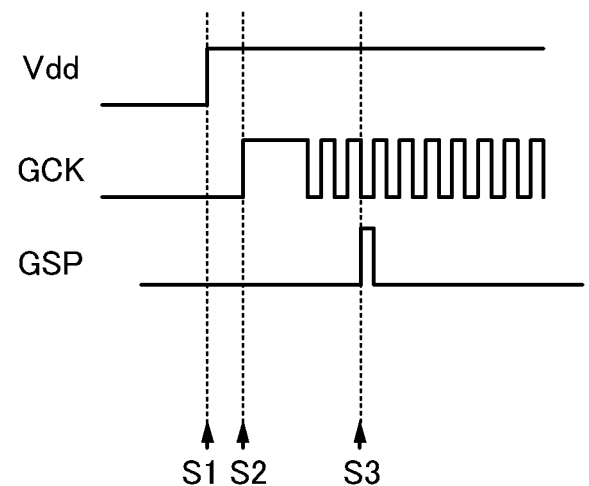

Next, operation of the panel controller in a period during which a display image is changed from a moving image to a still image (a period 903 in FIG. 6), and a period during which a display image is changed from a still image to a moving image (a period 904 in FIG. 6) will be described with reference to FIGS. 7A and 7B. FIGS. 7A and 7B illustrate potentials of high power supply potential Vdd, the clock signal (here, GCK) and the start pulse signal (here, GSP) which are output from the panel controller.

FIG. 7A illustrates operation of the panel controller in the period 903 during which a display image is changed from a moving image to a still image. The panel controller stops the supply of the start pulse GSP (E1 in FIG. 7A, a first step). The supply of the start pulse GSP is stopped and then, the supply of a plurality of clock signals GCK is stopped after pulse output reaches the last stage of the shift register (E2 in FIG. 7A, a second step). Then, the high power source potential Vdd of a power source voltage is changed to the low power source potential Vss (E3 in FIG. 7A, a third step).

Through the above steps, the supply of the signals to the driver circuit portion 806 can be stopped without causing malfunction of the driver circuit portion 806. The malfunction occurred when a display image is changed from a moving image to a still image causes noise, and the noise is held as a still image; therefore, a liquid crystal display device that includes a panel controller with fewer malfunctions can display a still image which whose quality is not likely to deteriorate because of a change in gray level.

The stop of supplying of any signal refers to stop of supplying of the predetermined potential to the wiring, and connection to a wiring to which a predetermined fixed potential is supplied, for example, a wiring to which the low power supply potential Vss is supplied.

Next, operation of the panel controller in the period 904 during which a display image is changed from a still image to a moving image will be illustrated in FIG. 7B. The panel controller changes a power source voltage from the low power source potential Vss to the high power source potential Vdd (S1 in FIG. 7B, a first step). A high-level potential is applied as the clock signal GCK, after that a plurality of clock signals GCK is supplied (S2 in FIG. 7B, a second step). Next, the start pulse signal GSP is supplied (S3 in FIG. 7B, a third step).

Through the above steps, the supply of drive signals to the driver circuit portion 806 can be resumed without causing malfunction of the driver circuit portion 806. The potentials of wirings are sequentially set back to those at the time of displaying a moving image, the driver circuit portion can be driven without malfunction.

Figure 8:
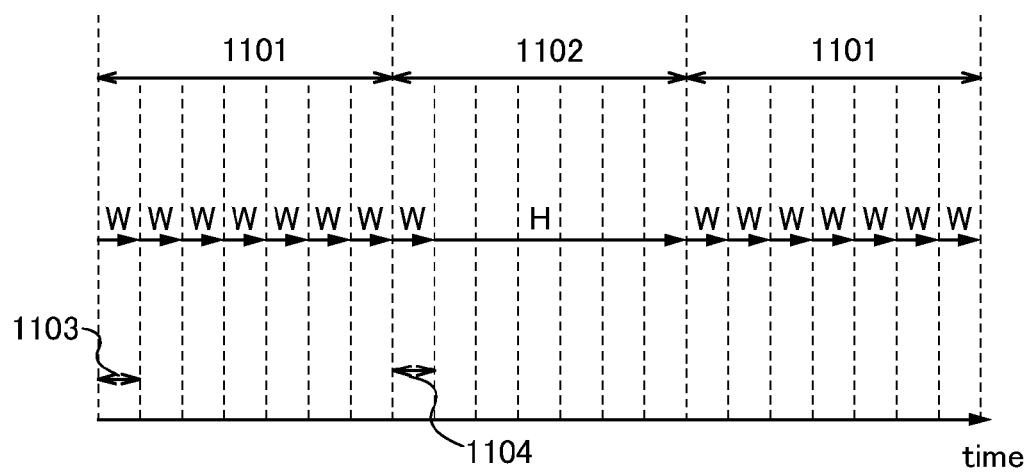
FIG. 8 illustrates a liquid crystal display device in one embodiment of the present invention.

FIG. 8 schematically illustrates writing frequency of image signal in each frame period in a period 1101 during which a moving image is displayed or in a period 1102 during which a still image is displayed. In FIG. 8, "W" indicates a period during which an image signal is written, and "H" indicates a period during which the image signal is held. In addition, a period 1103 is one frame period in FIG. 8; however, the period 1103 may be a period with a different length.

As described above, in the structure of the liquid crystal display device of this embodiment, an image signal of a still image displayed in the period 1102 is written in the period 1104, and the image signal written in the period 1104 is maintained in the other period of the period 1102.

The liquid crystal display device described in this embodiment as an example can decrease writing frequency of an image signal in a period during which a still image is displayed. As a result, power consumption at the time when a still image is displayed can be reduced.

In the case where a still image is displayed by rewriting the same image plural times, visible switching of the images may cause fatigue of the human eye. In the liquid crystal display device of this embodiment, writing frequency of an image signal is decreased, which makes eyestrain less severe.

In particular, in the liquid crystal display device of this embodiment, a transistor having low off-state current is applied to each pixel and a switching element of a common electrode, whereby a period (the length of time) in which a storage capacitor keeps voltage can be extended. As a result, writing frequency of an image signal can be extremely reduced, whereby there is a significant effect of reducing power consumption and realizing less severe eyestrain when a still image is displayed.

Embodiment 3

In this embodiment, an example of a transistor which can be applied to a liquid crystal display device disclosed in this specification will be described.

FIGS. 9A to 9D each illustrate an example of a cross-sectional structure of a transistor.

Figure 9A:
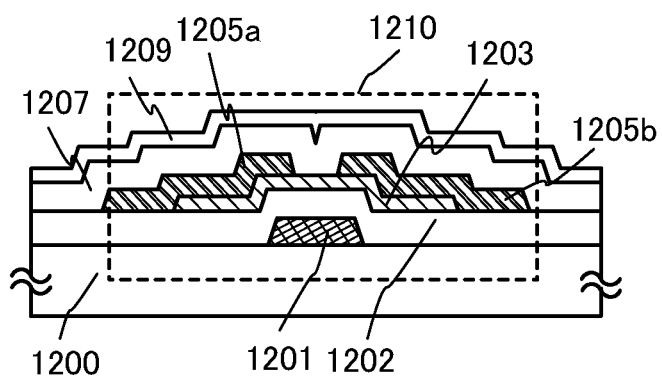
FIGS. 9A to 9D each illustrate a liquid crystal display device in one embodiment of the present invention.

A transistor 1210 illustrated in FIG. 9A is a kind of bottom-gate structure transistor and is also called an inverted staggered transistor.

The transistor 1210 includes, over a substrate 1200 having an insulating surface, a gate electrode layer 1201, a gate insulating layer 1202, a semiconductor layer 1203, a source electrode layer 1205a, and a drain electrode layer 1205b. An insulating layer 1207 is provided to cover the transistor 1210 and be stacked over the semiconductor layer 1203. A protective insulating layer 1209 is provided over the insulating layer 1207.

Figure 9B:
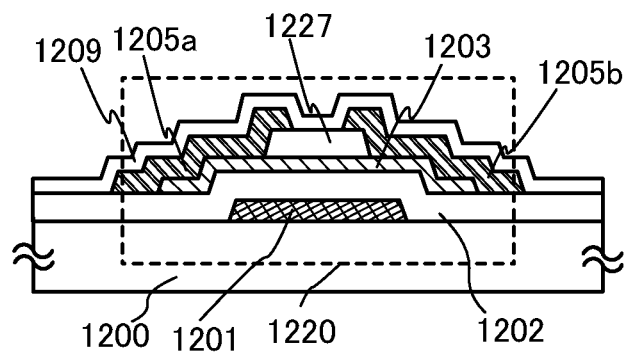

A transistor 1220 illustrated in FIG. 9B has a kind of bottom-gate structure called a channel-protective type (channel-stop type) and is also referred to as an inverted staggered transistor.

The transistor 1220 includes, over the substrate 1200 having an insulating surface, the gate electrode layer 1201, the gate insulating layer 1202, the semiconductor layer 1203, an insulating layer 1227 that is provided over a channel formation region in the semiconductor layer 1203 and functions as a channel protective layer, the source electrode layer 1205a, and the drain electrode layer 1205b. A protective insulating layer 1209 is provided to cover the transistor 1220.

Figure 9C:
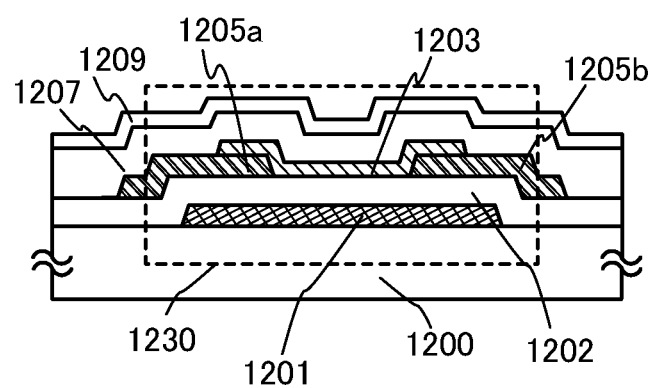

A transistor 1230 illustrated in FIG. 9C is a bottom-gate type transistor and includes, over a substrate 1200 which is a substrate having an insulating surface, a gate electrode layer 1201, a gate insulating layer 1202, a source electrode layer 1205a, a drain electrode layer 1205b, and a semiconductor layer 1203. An insulating layer 1207 is provided to cover the transistor 1230 and be in contact with the semiconductor layer 1203. A protective insulating layer 1209 is provided over the insulating layer 1207.

In the transistor 1230, the gate insulating layer 1202 is provided in contact with the substrate 1200 and the gate electrode layer 1201. The source electrode layer 1205a and the drain electrode layer 1205b are provided in contact with the gate insulating layer 1202. The semiconductor layer 1203 is provided over the gate insulating layer 1202, the source electrode layer 1205a, and the drain electrode layer 1205b.

Figure 9D:
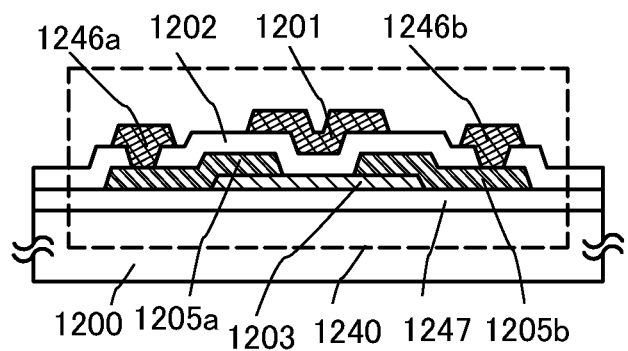

A transistor 1240 illustrated in FIG. 9D is a kind of top-gate structure transistor. The transistor 1240 includes, over a substrate 1200 having an insulating surface, an insulating layer 1247, a semiconductor layer 1203, a source electrode layer 1205a and a drain electrode layer 1205b, a gate insulating layer 1202, and a gate electrode layer 1201. A wiring layer 1246a and a wiring layer 1246b are provided in contact with the source electrode layer 1205a and the drain electrode layer 1205b, respectively, to be electrically connected to the source electrode layer 1205a and the drain electrode layer 1205b, respectively.

In this embodiment, an oxide semiconductor is used for the semiconductor layer 1203.

As an oxide semiconductor, an In—Sn—Ga—Zn—O-based metal oxide which is a four-component metal oxide; an In—Ga—Zn—O-based metal oxide, an In—Sn—Zn—O-based metal oxide, an In—Al—Zn—O-based metal oxide, a Sn—Ga—Zn—O-based metal oxide, an Al—Ga—Zn—O-based metal oxide, or a Sn—Al—Zn—O-based metal oxide which is a three-component metal oxide; an In—Zn—O-based metal oxide, a Sn—Zn—O-based metal oxide, an Al—Zn—O-based metal oxide, a Zn—Mg—O-based metal oxide, a Sn—Mg—O-based metal oxide, or an In—Mg—O-based metal oxide which is a two-component metal oxide; an In—O-based metal oxide, a Sn—O-based metal oxide, a Zn—O-based metal oxide, or the like can be used. Further, $SiO_2$ may be included in a semiconductor of the above metal oxide. Here, for example, an In—Ga—Zn—O-based metal oxide is an oxide including at least In, Ga, and Zn, and there is no particular limitation on the composition ratio thereof. Further, the In—Ga—Zn—O-based metal oxide may include an element other than In, Ga, and Zn.

As the oxide semiconductor, a thin film represented by the chemical formula, $InMO_3(ZnO)_m$ (m>0) can be used. Here, M represents one or more metal elements selected from Ga, Al, Mn, and Co. For example, M can be Ga, Ga and Al, Ga and Mn, Ga and Co, or the like.

Note that in the structure in this embodiment, the oxide semiconductor is an intrinsic (i-type) or substantially intrinsic semiconductor obtained by removal of hydrogen, which is an n-type impurity, from the oxide semiconductor for high purification so that the oxide semiconductor contains an impurity other than the main component as little as possible. In other words, the oxide semiconductor in this embodiment is a highly purified intrinsic (i-type) semiconductor or close to an intrinsic semiconductor obtained by removing impurities such as hydrogen and water as much as possible, not by adding an impurity element. Therefore, the oxide semiconductor layer included in the transistor is a highly purified and electrically i-type (intrinsic) oxide semiconductor layer. In addition, the band gap of the oxide semiconductor is 2.0 eV or more, preferably 2.5 eV or more, still preferably 3.0 eV or more. Thus, in the oxide semiconductor, the generation of carriers due to thermal excitation can be suppressed. Therefore, the amount of increase in off-state current due to an increase in the operation temperature can be reduced in a transistor in which the channel formation region is formed using the oxide semiconductor.

The number of carriers in the highly purified oxide semiconductor is very small (close to zero), and the carrier concentration is less than $1\times10^{14}/cm^3$, preferably less than $1\times10^{12}/cm^3$, further preferably less than $1\times10^{11}/cm^3$.

The number of carriers in the oxide semiconductor is so small that the off-state current of the transistor can be reduced. Specifically, the off-state current of the transistor in which an oxide semiconductor is used for the semiconductor layer (per channel width of 1 μm) can be reduced to 10 aA/μm ($1\times10^{-17}$ A/μm) or lower, further reduced to 1 aA/μm ($1\times10^{-18}$ A/m) or lower, and still further reduced to 10 zA/μm ($1\times10^{-20}$ A/μm). In other words, in circuit design, the oxide semiconductor can be regarded as an insulator when the transistor is off. Moreover, when the transistor is on, the current supply capability of the oxide semiconductor is expected to be higher than that of a semiconductor layer formed of amorphous silicon.

In each of the transistors 1210, 1220, 1230, and 1240 which an oxide semiconductor is used for a semiconductor layer 1203, the current in an off state (the off-state current) can be low. Thus, the retention time for an electric signal such as image data can be extended, and an interval between writings can be extended. As a result, the refresh rate can be reduced, so that power consumption can be further reduced.

Furthermore, the transistors 1210, 1220, 1230, and 1240 in each of which an oxide semiconductor is used for a semiconductor layer 1203 can have relatively high field-effect mobility as the ones formed using an amorphous semiconductor; thus, the transistors can operate at high speed. As a result, high functionality and high-speed response of a display device can be realized.

Although there is no particular limitation on a substrate that can be used as the substrate 1200 having an insulating surface, the substrate needs to have heat resistance at least high enough to withstand heat treatment to be performed later. A glass substrate made of barium borosilicate glass, aluminoborosilicate glass, or the like may be used.

In the case where the temperature of heat treatment to be performed later is high, a glass substrate whose strain point is greater than or equal to 730° C. is preferably used. For a glass substrate, a glass material such as aluminosilicate glass, aluminoborosilicate glass, or barium borosilicate glass is used, for example. Note that a glass substrate containing a larger amount of barium oxide (BaO) than boron oxide ($B_2O_3$), which is practical heat-resistant glass, may be used.

Note that a substrate formed of an insulator, such as a ceramic substrate, a quartz substrate, or a sapphire substrate, may be used instead of the glass substrate. Alternatively, crystallized glass or the like may be used. A plastic substrate or the like may be used as appropriate.

In the bottom-gate structure transistors 1210, 1220, and 1230, an insulating film serving as a base film may be provided between the substrate and the gate electrode layer. The base film has a function of preventing diffusion of an impurity element from the substrate, and can be formed with a single-layer structure or a layered structure including a silicon nitride film, a silicon oxide film, a silicon nitride oxide film, and/or a silicon oxynitride film.

The gate electrode layer 1201 can be formed with a single-layer structure or a layered structure using a metal material such as molybdenum, titanium, chromium, tantalum, tungsten, aluminum, copper, neodymium, or scandium or an alloy material containing any of these materials as its main component.

As a two-layer structure of the gate electrode layer 1201, any of the following layered structures is preferably employed, for example: a two-layer structure in which a molybdenum layer is stacked over an aluminum layer, a two-layer structure in which a molybdenum layer is stacked over a copper layer, a two-layer structure in which a titanium nitride layer or a tantalum nitride layer is stacked over a copper layer, or a two-layer structure in which a titanium nitride layer and a molybdenum layer are stacked. As a three-layer structure of the gate electrode layer 1201, it is preferable to employ a stack of a tungsten layer or a tungsten nitride layer, a layer of an alloy of aluminum and silicon or an alloy of aluminum and titanium, and a titanium nitride layer or a titanium layer. Note that the gate electrode layer may be formed using a light-transmitting conductive film. An example of a material for the light-transmitting conductive film is a light-transmitting conductive oxide.

The gate insulating layer 1202 can be formed with a single-layer structure or a layered structure using any of a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, and a hafnium oxide layer by a plasma CVD method, sputtering, or the like.

The gate insulating layer 1202 may have a structure in which a silicon nitride layer and a silicon oxide layer are stacked from the gate electrode layer side. For example, a 100-nm-thick gate insulating layer is formed in such a manner that a silicon nitride layer ($SiN_y$ (y>0)) having a thickness of 50 nm to 200 nm is formed as a first gate insulating layer by sputtering and then a silicon oxide layer ($SiO_x$ (x>0)) having a thickness of 5 nm to 300 nm is stacked as a second gate insulating layer over the first gate insulating layer. The thickness of the gate insulating layer 1202 may be set as appropriate depending on characteristics needed for a transistor, and may be approximately 350 nm to 400 nm.

For a conductive film used for the source electrode layer 1205a and the drain electrode layer 1205b, an element selected from Al, Cr, Cu, Ta, Ti, Mo, and W, an alloy containing any of these elements, or an alloy film containing a combination of any of these elements can be used, for example. A structure may be employed in which a high-melting-point metal layer of Cr, Ta, Ti, Mo, W, or the like is stacked on one or both of a top surface and a bottom surface of a metal layer of Al, Cu, or the like. By using an aluminum material to which an element preventing generation of hillocks and whiskers in an aluminum film, such as Si, Ti, Ta, W, Mo, Cr, Nd, Sc, or Y, is added, heat resistance can be increased.

A conductive film serving as the wiring layers 1246a and 1246b connected to the source electrode layer 1205a and the drain electrode layer 1205b may be formed using a material similar to that of the source and drain electrode layers 1205a and 1205b.

The source electrode layer 1205a and the drain electrode layer 1205b may have a single-layer structure or a layered structure of two or more layers. For example, the source electrode layer 1205a and the drain electrode layer 1205b can have a single-layer structure of an aluminum film containing silicon, a two-layer structure in which a titanium film is stacked over an aluminum film, or a three-layer structure in which a titanium film, an aluminum film, and a titanium film are stacked in this order.

The conductive film to be the source electrode layer 1205a and the drain electrode layer 1205b (including a wiring layer formed using the same layer as the source and drain electrode layers) may be formed using a conductive metal oxide. As the conductive metal oxide, indium oxide ($In_2O_3$), tin oxide ($SnO_2$), zinc oxide (ZnO), an alloy of indium oxide and tin oxide ($In_2O_3$—$SnO_2$, referred to as ITO), an alloy of indium oxide and zinc oxide ($In_2O_3$—ZnO), or any of the metal oxide materials containing silicon or silicon oxide can be used.

As the insulating layers 1207, 1227, and 1247 and the protective insulating layer 1209, an inorganic insulating film such as an oxide insulating layer or a nitride insulating layer is preferably used.

As the insulating layers 1207, 1227, and 1247, an inorganic insulating film such as a silicon oxide film, a silicon oxynitride film, an aluminum oxide film, or an aluminum oxynitride film can be typically used.

As the protective insulating layer 1209, an inorganic insulating film such as a silicon nitride film, an aluminum nitride film, a silicon nitride oxide film, or an aluminum nitride oxide film can be used.

A planarization insulating film may be formed over the protective insulating layer 1209 in order to reduce surface roughness due to the transistor. The planarization insulating film can be formed using a heat-resistant organic material such as polyimide, acrylic, benzocyclobutene, polyamide, or epoxy. Other than such organic materials, it is possible to use a low-dielectric constant material (a low-k material), a siloxane-based resin, PSG (phosphosilicate glass), BPSG (borophosphosilicate glass), or the like. Note that the planarization insulating film may be formed by stacking a plurality of insulating films formed from these materials.

By using the transistor in which an oxide semiconductor is used for a semiconductor layer in this embodiment, it is possible to provide a highly functional liquid crystal display device with lower power consumption.

This embodiment can be implemented in appropriate combination with the structures described in the other embodiments.

Embodiment 4

When transistors are manufactured and used for a pixel portion and a driver circuit, a liquid crystal display device having a display function can be manufactured. Further, part of or the entire driver circuit can be formed over a substrate where a pixel portion is formed, using a transistor; thus, a system-on-panel can be obtained.

Note that the liquid crystal display device includes any of the following modules in its category: a module provided with a connector, for example, a flexible printed circuit (FPC), a tape automated bonding (TAB) tape, or a tape carrier package (TCP); a module provided with a printed wiring board at the end of a TAB tape or a TCP; and a module where an integrated circuit (IC) is directly mounted on a display element by a chip-on-glass (COG) method.

The appearance and a cross section of a liquid crystal display device will be described with reference to FIGS. 10A1, 10A2, and 10B. FIGS. 10A1 and 10A2 are plan views of panels in which transistors 4010 and 4011 and a liquid crystal element 4013 are sealed between a first substrate 4001 and a second substrate 4006 with a sealant 4005. FIG. 10B is a cross-sectional view along M-N in FIGS. 10A1 and 10A2.

The sealant 4005 is provided so as to surround a pixel portion 4002 and a scan line driver circuit 4004 that are provided over the first substrate 4001. The second substrate 4006 is provided over the pixel portion 4002 and the scan line driver circuit 4004. Therefore, the pixel portion 4002 and the scan line driver circuit 4004 are sealed together with a liquid crystal layer 4008, by the first substrate 4001, the sealant 4005, and the second substrate 4006. A signal line driver circuit 4003 that is formed using a single crystal semiconductor film or a polycrystalline semiconductor film over a substrate separately prepared is mounted in a region that is different from the region surrounded by the sealant 4005 over the first substrate 4001.

Note that there is no particular limitation on the connection method of a driver circuit that is separately formed, and a COG method, a wire bonding method, a TAB method, or the like may be used. FIG. 10A1 illustrates an example where the signal line driver circuit 4003 is mounted by a COG method. FIG. 10A2 illustrates an example where the signal line driver circuit 4003 is mounted by a TAB method.

The pixel portion 4002 and the scan line driver circuit 4004 provided over the first substrate 4001 include a plurality of transistors. FIG. 10B illustrates the transistor 4010 included in the pixel portion 4002 and the transistor 4011 included in the scan line driver circuit 4004. Insulating layers 4041a, 4041b, 4042a, 4042b, 4020, and 4021 are provided over the transistors 4010 and 4011.

A transistor in which an oxide semiconductor is used for a semiconductor layer may be used as the transistors 4010 and 4011. In this embodiment, the transistors 4010 and 4011 are n-channel transistors.

A conductive layer 4040 is provided over part of the insulating layer 4021, which overlaps with a channel formation region including an oxide semiconductor in the transistor 4011 for the driver circuit. The conductive layer 4040 is provided at the position overlapping with the channel formation region including an oxide semiconductor, so that the amount of change in threshold voltage of the transistor 4011 before and after the BT (bias-temperature) test can be reduced. The potential of the conductive layer 4040 may be the same or different from that of a gate electrode layer of the transistor 4011. The conductive layer 4040 can also function as a second gate electrode layer. The potential of the conductive layer 4040 may be GND or 0 V, or the conductive layer 4040 may be in a floating state.

A pixel electrode layer 4030 included in the liquid crystal element 4013 is electrically connected to the transistor 4010. A counter electrode layer 4031 of the liquid crystal element 4013 is provided for the second substrate 4006. A portion where the pixel electrode layer 4030, the counter electrode layer 4031, and the liquid crystal layer 4008 overlap with one another corresponds to the liquid crystal element 4013. Note that the pixel electrode layer 4030 and the counter electrode layer 4031 are provided with an insulating layer 4032 and an insulating layer 4033 functioning as alignment films, respectively, and the liquid crystal layer 4008 is sandwiched between the pixel electrode layer 4030 and the counter electrode layer 4031 with the insulating layers 4032 and 4033 provided therebetween.

Note that a light-transmitting substrate can be used as the first substrate 4001 and the second substrate 4006; glass, ceramics, or plastics may be used. As plastics, a fiberglass-reinforced plastics (FRP) plate, a polyvinyl fluoride (PVF) film, a polyester film, or an acrylic resin film can be used.

A spacer 4035 is a columnar spacer obtained by selective etching of an insulating film and is provided in order to control the distance (a cell gap) between the pixel electrode layer 4030 and the counter electrode layer 4031. Note that a spherical spacer may be used. The counter electrode layer 4031 is electrically connected to a common potential line formed over the substrate where the transistor 4010 is formed. With use of the common connection portion, the counter electrode layer 4031 and the common potential line can be electrically connected to each other by conductive particles arranged between a pair of substrates. Note that the conductive particles can be included in the sealant 4005.

Alternatively, liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase is only generated within a narrow range of temperature, a liquid crystal composition containing a chiral agent at 5 wt % or more so as to improve the temperature range is used for the liquid crystal layer 4008. The liquid crystal composition that includes a liquid crystal exhibiting a blue phase and a chiral agent has a short response time of 1 msec or less, has optical isotropy, which makes the alignment process unneeded, and has a small viewing angle dependence.

Note that this embodiment can also be applied to a transflective liquid crystal display device in addition to a transmissive liquid crystal display device.

This embodiment shows the example of the liquid crystal display device in which a polarizing plate is provided on the outer side of the substrate (on the viewer side) and a coloring layer and an electrode layer used for a display element are provided in this order on the inner side of the substrate; alternatively, a polarizing plate may be provided on the inner side of the substrate. The layered structure of the polarizing plate and the coloring layer is not limited to that in this embodiment and may be set as appropriate depending on materials of the polarizing plate and the coloring layer or conditions of the manufacturing process. Further, a light-blocking film serving as a black matrix may be provided in a portion other than a display portion.

The insulating layer 4041a that serves as a channel protective layer and the insulating layer 4041b that covers an outer edge portion (including a side surface) of the stack of the semiconductor layers including an oxide semiconductor are formed in the transistor 4011. In a similar manner, the insulating layer 4042a that serves as a channel protective layer and the insulating layer 4042b that covers an outer edge portion (including a side surface) of the stack of the semiconductor layers including an oxide semiconductor are formed in the transistor 4010.

The insulating layers 4041b and 4042b that are oxide insulating layers covering the outer edge portion (including the side surface) of the stack of the oxide semiconductor layers can increase the distance between the gate electrode layer and a wiring layer (e.g., a source wiring layer or a capacitor wiring layer) formed over or around the gate electrode layer, so that the parasitic capacitance can be reduced. In order to reduce the surface roughness of the transistors, the transistors are covered with the insulating layer 4021 serving as a planarizing insulating film. Here, as the insulating layers 4041a, 4041b, 4042a, and 4042b, a silicon oxide film is formed by sputtering, for example.

Moreover, the insulating layer 4020 is formed over the insulating layers 4041a, 4041b, 4042a, and 4042b. As the insulating layer 4020, a silicon nitride film is formed by RF sputtering, for example.

The insulating layer 4021 is formed as the planarizing insulating film. As the insulating layer 4021, an organic material having heat resistance, such as polyimide, acrylic, benzocyclobutene, polyamide, or epoxy can be used. Other than such organic materials, it is also possible to use a low-dielectric constant material (a low-k material), a siloxane-based resin, PSG (phosphosilicate glass), BPSG (borophosphosilicate glass), or the like. Note that the insulating layer 4021 may be formed by stacking a plurality of insulating films formed of these materials.

In this embodiment, a plurality of transistors in the pixel portion may be surrounded together by a nitride insulating film. It is possible to use a nitride insulating film as the insulating layer 4020 and the gate insulating layer and to provide a region where the insulating layer 4020 is in contact with the gate insulating layer so as to surround at least the periphery of the pixel portion in the active matrix substrate. In this manufacturing process, entry of moisture from the outside can be prevented. Further, even after the device is completed as a liquid crystal display device, entry of moisture from the outside can be prevented in the long term, and the long-term reliability of the device can be improved.

Note that a siloxane-based resin corresponds to a resin including a Si—O—Si bond formed using a siloxane-based material as a starting material. The siloxane-based resin may include an organic group (e.g., an alkyl group or an aryl group) or a fluoro group as a substituent. The organic group may include a fluoro group.

There is no particular limitation on the formation method of the insulating layer 4021, and any of the following methods and tools can be employed, for example, depending on the material: sputtering, an SOG method, a spin coating method, a dipping method, a spray coating method, a droplet discharge method (e.g., an ink-jet method, screen printing, and offset printing), a doctor knife, a roll coater, a curtain coater, and a knife coater. The baking step of the insulating layer 4021 also serves as annealing of the semiconductor layer, so that a liquid crystal display device can be efficiently manufactured.

The pixel electrode layer 4030 and the counter electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (referred to as ITO), indium zinc oxide, or indium tin oxide to which silicon oxide is added.

Alternatively, the pixel electrode layer 4030 and the counter electrode layer 4031 can be formed using a conductive composition including a conductive high molecule (also referred to as a conductive polymer). The pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to 0.1 Ω·cm.

As the conductive high molecule, a so-called π-electron conjugated conductive high molecule can be used. For example, polyaniline or a derivative thereof, polypyrrole or a derivative thereof, polythiophene or a derivative thereof, and a copolymer of two or more of aniline, pyrrole, and thiophene or a derivative thereof can be given.

A variety of signals and potentials are supplied from an FPC 4018 to the signal line driver circuit 4003 which is formed separately, the scan line driver circuit 4004, or the pixel portion 4002.

A connection terminal electrode 4015 is formed from the same conductive film as the pixel electrode layer 4030 included in the liquid crystal element 4013, and a terminal electrode 4016 is formed from the same conductive film as source and drain electrode layers of the transistors 4010 and 4011.

The connection terminal electrode 4015 is electrically connected to a terminal included in the FPC 4018 via an anisotropic conductive film 4019.

Note that FIGS. 10A1 and 10A2 illustrate the example in which the signal line driver circuit 4003 is formed separately and mounted on the first substrate 4001; however, the this embodiment is not limited to this structure. The scan line driver circuit may be separately formed and then mounted, or only part of the signal line driver circuit or part of the scan line driver circuit may be separately formed and then mounted.

Figure 11:
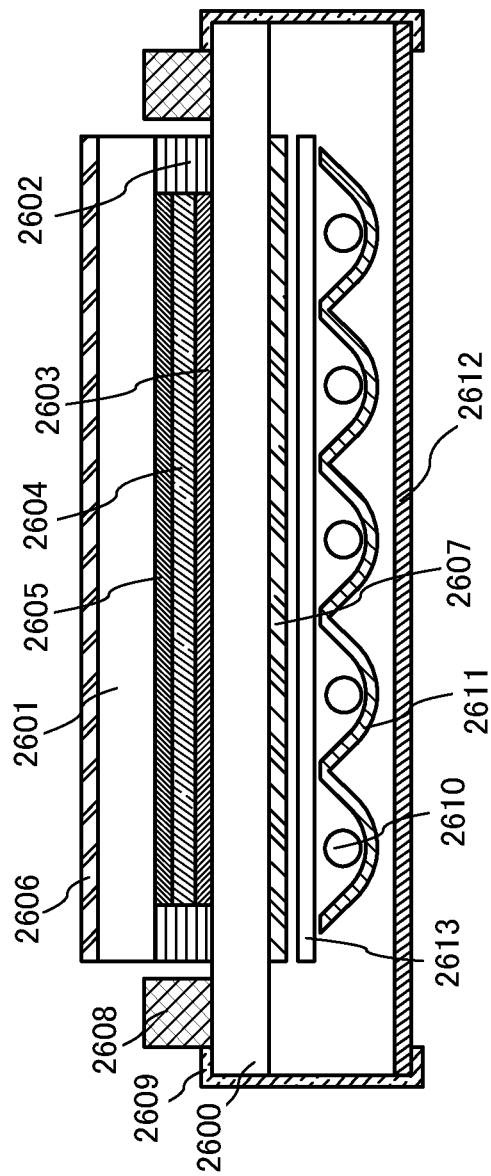
FIG. 11 illustrates a liquid crystal display device in one embodiment of the present invention.

FIG. 11 illustrates an example of a structure of a liquid crystal display device.

FIG. 11 illustrates an example of a liquid crystal display device. A TFT substrate 2600 and a counter substrate 2601 are fixed to each other with a sealant 2602. A pixel portion 2603 including a TFT and the like, a display element 2604 including a liquid crystal layer, and a coloring layer 2605 are provided between the substrates so that a display region is formed. The coloring layer 2605 is necessary to perform color display. In the RGB system, coloring layers corresponding to colors of red, green, and blue are provided for pixels. A polarizing plate 2606 is provided on the outer side of the counter substrate 2601. A polarizing plate 2607 and a diffusion plate 2613 are provided on the outer side of the TFT substrate 2600. A light source includes a cold cathode tube 2610 and a reflective plate 2611. A circuit board 2612 is connected to a wiring circuit portion 2608 of the TFT substrate 2600 by a flexible wiring board 2609 and includes an external circuit such as a control circuit or a power source circuit. The polarizing plate and the liquid crystal layer may be stacked with a retardation plate therebetween.

For a method for driving the liquid crystal display device, a TN (twisted nematic) mode, an IPS (in-plane-switching) mode, an FFS (fringe field switching) mode, an MVA (multi-domain vertical alignment) mode, a PVA (patterned vertical alignment) mode, an ASM (axially symmetric aligned microcell) mode, an OCB (optically compensated birefringence) mode, an FLC (ferroelectric liquid crystal) mode, an AFLC (antiferroelectric liquid crystal) mode, or the like can be used.

Through the above-described process, it is possible to manufacture a liquid crystal display device in which deterioration in image quality due to a change in gray level can be reduced in displaying a still image.

This embodiment may be implemented in appropriate combination with the structures described in the other embodiments.

Embodiment 5

In this embodiment, a structure of the liquid crystal display device described in the above embodiments which has a touch-panel function is described with reference to FIGS. 12A and 12B.

Figure 12A:
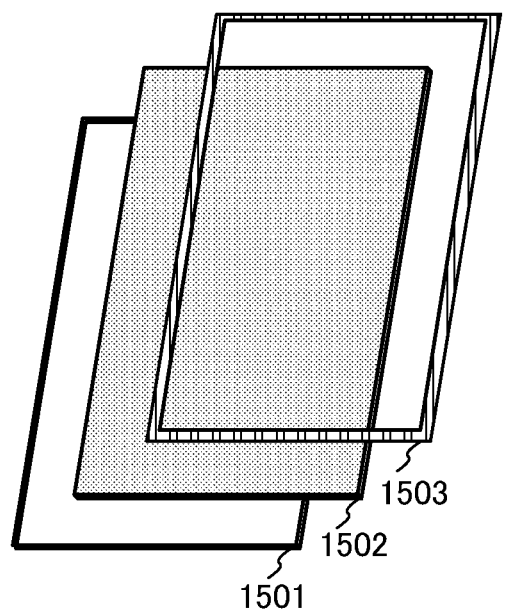
FIGS. 12A and 12B each illustrate a liquid crystal display device in one embodiment of the present invention.

FIG. 12A is a schematic view of a liquid crystal display device of this embodiment. FIG. 12A illustrates a structure in which a touch panel unit 1502 is stacked on a liquid crystal display panel 1501 which is the liquid crystal display device of the above embodiment and they are attached with a housing (case) 1503. As the touch panel unit 1502, a resistive touch sensor, a surface capacitive touch sensor, a projected capacitive touch sensor, or the like can be used as appropriate.

The liquid crystal display panel 1501 and the touch panel unit 1502 are manufactured separately and stacked as illustrated in FIG. 12A, whereby the cost of manufacturing a liquid crystal display device having a touch-panel function can be reduced.

Figure 12B:
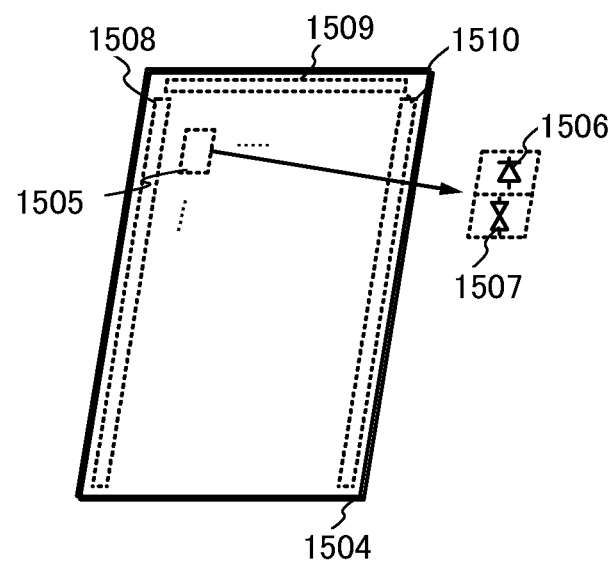

FIG. 12B illustrates a structure of a liquid crystal display device having a touch-panel function, which is different from that illustrated in FIG. 12A. A liquid crystal display device 1504 illustrated in FIG. 12B includes a plurality of pixels 1505 each having a light sensor 1506 and a liquid crystal element 1507. Therefore, the touch panel unit 1502 is not necessarily stacked, which is different from that illustrated in FIG. 12A. Thus, a liquid crystal display device can be thinned. Further, a gate line driver circuit 1508, a signal line driver circuit 1509, and a light sensor driver circuit 1510 are manufactured over the same substrate as the pixels 1505. Thus, a liquid crystal display device can be reduced in size. Note that the light sensor 1506 may be formed using amorphous silicon or the like and stacked on a transistor including an oxide semiconductor.

A transistor including an oxide semiconductor layer is used in a liquid crystal display device having a touch-panel function, whereby image holding characteristics in displaying a still image can be improved. Further, deterioration in image quality which is owing to a change in gray level caused by refresh rate reduction in displaying a still image can be reduced.

Note that this embodiment can be combined with other embodiments as appropriate.

Embodiment 6

In this embodiment, an example of an electronic device including the liquid crystal display device described in any of the above-described embodiments will be described.

Figure 13A:
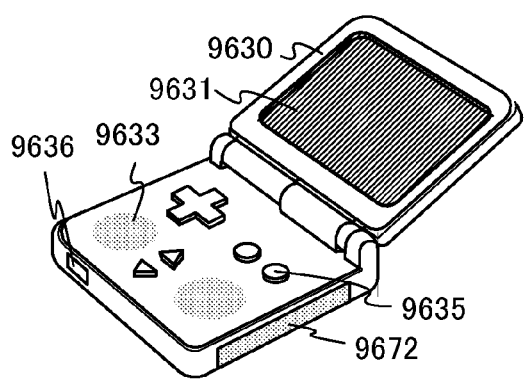
FIGS. 13A to 13D each illustrate an electronic device in one embodiment of the present invention.

FIG. 13A illustrates a portable game machine that can include a housing 9630, a display portion 9631, a speaker 9633, operation keys 9635, a connection terminal 9636, a recording medium reading portion 9672, and the like. The portable game machine in FIG. 13A can have a function of reading a program or data stored in the recording medium to display it on the display portion, a function of sharing information with another portable game machine by wireless communication, and the like. Note that the functions of the portable game machine in FIG. 13A are not limited to those described above, and the portable game machine can have various functions.

Figure 13B:
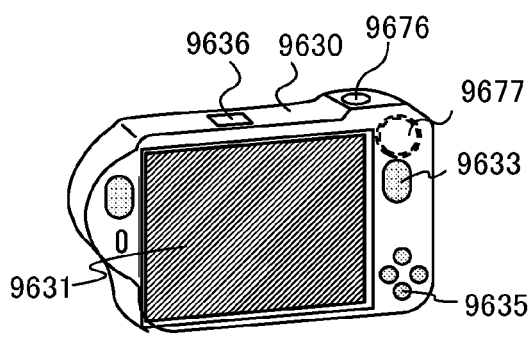

FIG. 13B illustrates a digital camera that can include a housing 9630, a display portion 9631, a speaker 9633, operation keys 9635, a connection terminal 9636, a shutter button 9676, an image receiving portion 9677, and the like. The digital camera in FIG. 13B can have a function of photographing a still image and/or a moving image, a function of automatically or manually correcting the photographed image, a function of obtaining various kinds of information from an antenna, a function of saving the photographed image or the information obtained from the antenna, a function of displaying the photographed image or the information obtained from the antenna on the display portion, and the like. Note that the digital camera in FIG. 13B can have a variety of functions without being limited to the above.

Figure 13C:
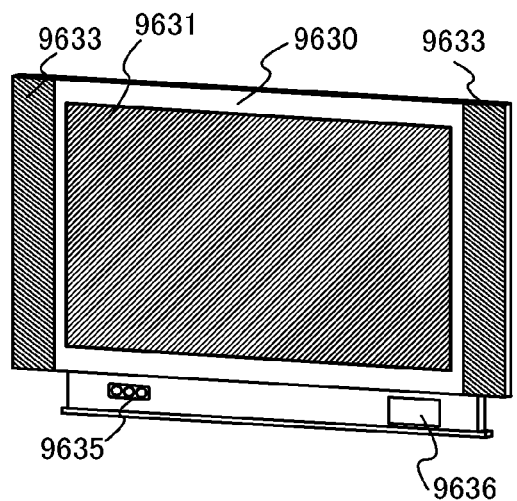

FIG. 13C illustrates a television set that can include a housing 9630, a display portion 9631, speakers 9633, operation key 9635, a connection terminal 9636, and the like. The television set in FIG. 13C has a function of converting an electric wave for television into an image signal, a function of converting an image signal into a signal suitable for display, a function of converting the frame frequency of an image signal, and the like. Note that the television set in FIG. 13C can have a variety of functions without being limited to the above.

Figure 13D:
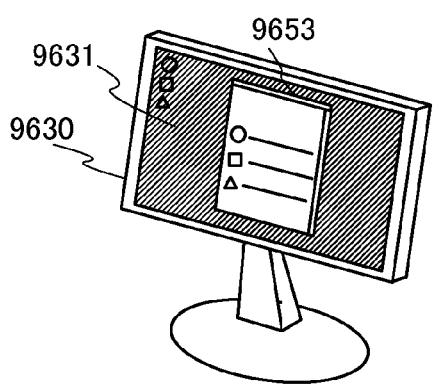

FIG. 13D illustrates a monitor for electronic computers (personal computers) (the monitor is also referred to as a PC monitor) that can include a housing 9630, a display portion 9631, and the like. As an example, in the monitor in FIG. 13D, a window 9653 is displayed on the display portion 9631. Note that FIG. 13D illustrates the window 9653 displayed on the display portion 9631 for explanation; a symbol such as an icon or an image may be displayed. Because in the monitor for personal computers, an image signal is often rewritten only in an input operation, the method for driving a liquid crystal display device in the above-described embodiment is preferably applied. Note that the monitor in FIG. 13D can have various functions without being limited to the above.

Figure 14A:
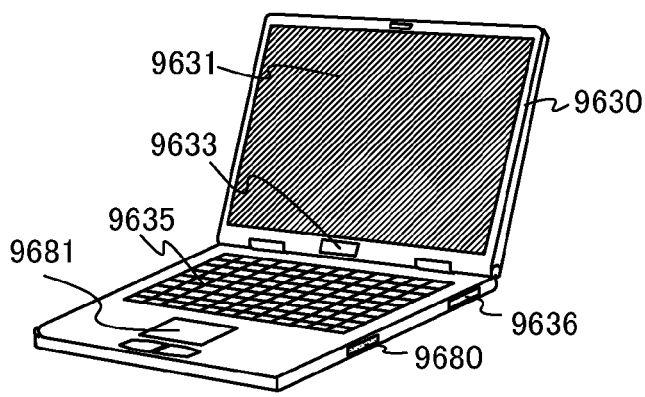
FIGS. 14A to 14D each illustrate an electronic device in one embodiment of the present invention.

FIG. 14A illustrates a computer that can include a housing 9630, a display portion 9631, a speaker 9633, operation keys 9635, a connection terminal 9636, a pointing device 9681, an external connection port 9680, and the like. The computer in FIG. 14A can have a function of displaying a variety of information (e.g., a still image, a moving image, and a text image) on the display portion, a function of controlling processing by a variety of software (programs), a communication function such as wireless communication or wired communication, a function of being connected to various computer networks with the communication function, a function of transmitting or receiving a variety of data with the communication function, and the like. Note that the computer in FIG. 14A is not limited to having these functions and can have a variety of functions.

Figure 14B:
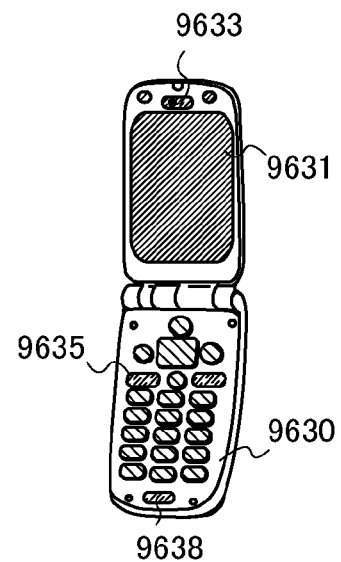

FIG. 14B illustrates a mobile phone that can include a housing 9630, a display portion 9631, a speaker 9633, operation keys 9635, a microphone 9638, and the like. The mobile phone in FIG. 14B can have a function of displaying a variety of information (e.g., a still image, a moving image, and a text image) on the display portion; a function of displaying a calendar, a date, the time, or the like on the display portion; a function of operating or editing the information displayed on the display portion; a function of controlling processing by various kinds of software (programs); and the like. Note that the functions of the mobile phone in FIG. 14B are not limited to those described above, and the mobile phone can have various functions.

Figure 14C:
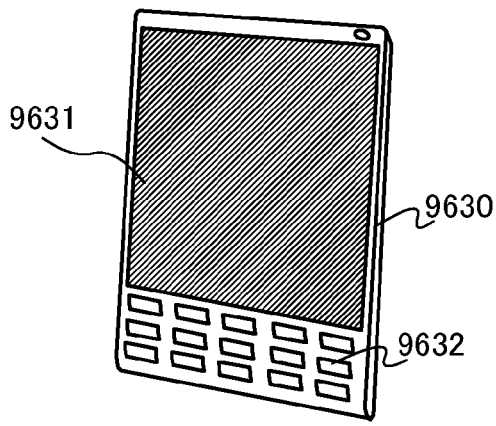
Figure 14D:
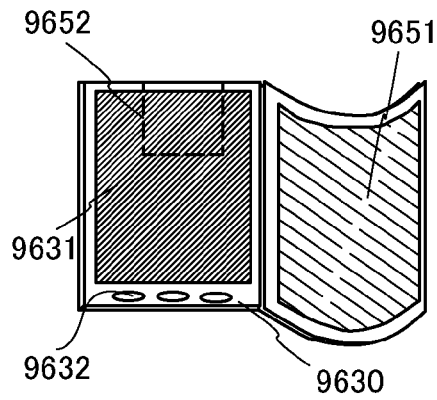

FIG. 14C illustrates an electronic device including electronic paper (also referred to as an eBook or an e-book reader) that can include a housing 9630, a display portion 9631, operation keys 9632, and the like. The e-book reader in FIG. 14C can have a function of displaying a variety of information (e.g., a still image, a moving image, and a text image) on the display portion; a function of displaying a calendar, a date, the time, and the like on the display portion; a function of operating or editing the information displayed on the display portion; a function of controlling processing by various kinds of software (programs); and the like. Note that the e-book reader in FIG. 14C can have a variety of functions without being limited to the above functions. FIG. 14D illustrates another structure of an e-book reader. The e-book reader in FIG. 14D has a structure obtained by adding a solar battery 9651 and a battery 9652 to the e-book reader in FIG. 14C. When a reflective liquid crystal display device is used as the display portion 9631, the e-book reader is expected to be used in a comparatively bright environment, in which case the structure in FIG. 14D is preferable because the solar battery 9651 can efficiently generate power and the battery 9652 can efficiently charge power. Note that when a lithium ion battery is used as the battery 9652, an advantage such as reduction in size can be obtained.

In the electronic device described in this embodiment, deterioration in image quality which is owing to a change in gray level caused by refresh rate reduction in displaying a still image can be reduced.

This embodiment may be implemented in appropriate combination with the structures described in the other embodiments.

This application is based on Japanese Patent Application serial no. 2010-028965 filed with the Japan Patent Office on Feb. 12, 2010, the entire contents of which are hereby incorporated by reference.

The invention claimed is:

1. A liquid crystal display device comprising:
a driver circuit configured to control a display portion; and
a timing controller configured to control the driver circuit,
wherein the timing controller is configured to be supplied with an image signal for displaying a still image,
wherein the timing controller is configured to supply a start pulse, a clock signal, and a potential to the driver circuit,
wherein the potential is selected from a first potential and a second potential which is smaller than the first potential,
wherein the timing controller is configured to stop the clock signal after the start pulse stops and to change the potential from the first potential to the second potential after the clock signal stops,
wherein the timing controller is configured to start supplying the clock signal after the potential is changed from the second potential to the first potential and to start supplying the start pulse after the supply of the clock signal is started, and
wherein the timing controller is configured to determine a refresh rate to display an image corresponding to a total number of gray levels in the image signal on the display portion.

2. The liquid crystal display device according to claim 1, wherein the timing controller comprises:
an analyzing portion configured to judge the total number of gray levels of the image signal, and generate a signal corresponding to the total number of gray levels;
a lookup table portion configured to store a lookup table for determining the refresh rate in accordance with the signal; and
a panel controller controlled by the lookup table portion in accordance with the lookup table.

3. The liquid crystal display device according to claim 2, wherein the analyzing portion comprises:
a counter circuit provided for counting a bit of the image signal and configured to judge a change of the bit; and
a determining portion configured to judge whether an output from the count circuit changes or not and to output a result of the judgment to the lookup table portion.

4. The liquid crystal display device according to claim 1, wherein each pixel in the display portion comprises a transistor, and
wherein a semiconductor layer of the transistor includes an oxide semiconductor.

5. The liquid crystal display device according to claim 4, wherein the oxide semiconductor comprises at least one of indium, gallium, tin, and zinc.

6. An electronic device comprising the liquid crystal display device according to claim 1.

7. The liquid crystal display device according to claim 1, wherein the timing controller is configured to reduce a refresh rate to display an image corresponding to the image signal on the display portion as a total number of gray levels of the image signal is smaller.

8. A liquid crystal display device comprising:
a driver circuit configured to control a display portion;
a timing controller configured to control the driver circuit; and
an image process circuit configured to process an image signal, and to output a processing image signal to the timing controller,
wherein the timing controller is configured to supply a start pulse, a clock signal, and a potential,
wherein the potential is selected from a first potential and a second potential which is smaller than the first potential,
wherein the timing controller is configured to stop the clock signal after the start pulse stops and to change the potential from the first potential to the second potential after the clock signal stops,
wherein the timing controller is configured to start supplying the clock signal after the potential is changed from the second potential to the first potential and to start supplying the start pulse after the supply of the clock signal is started, and
wherein the timing controller is configured to determine a refresh rate to display an image corresponding to a total number of gray levels in the processing image signal on the display portion.

9. The liquid crystal display device according to claim 8, wherein the timing controller comprises:
an analyzing portion configured to judge the total number of gray levels of the processing image signal, and generate a signal corresponding to the total number of gray levels;
a lookup table portion configured to store a lookup table for determining the refresh rate in accordance with the signal; and
a panel controller controlled by the lookup table portion in accordance with the lookup table.

10. The liquid crystal display device according to claim 9, wherein the analyzing portion comprises:
a counter circuit provided for counting a bit of the processing image signal and configured to judge a change of the bit; and
a determining portion configured to judge whether an output from the count circuit changes or not and to output a result of the judgment to the lookup table portion.

11. The liquid crystal display device according to claim 8, wherein each pixel in the display portion comprises a transistor, and
wherein a semiconductor layer of the transistor includes an oxide semiconductor.

12. The liquid crystal display device according to claim 11, wherein the oxide semiconductor comprises at least one of indium, gallium, tin, and zinc.

13. An electronic device comprising the liquid crystal display device according to claim 8.

14. The liquid crystal display device according to claim 8, wherein the timing controller is configured to reduce a refresh rate to display an image corresponding to the processing image signal on the display portion as a total number of gray levels of the processing image signal is smaller.

15. A liquid crystal display device comprising:
a driver circuit configured to control a display portion; and
a timing controller configured to control the driver circuit,
wherein the timing controller is configured to convert a first refresh rate into a second refresh rate in the display portion in a first state and to convert the second refresh rate into the first refresh rate in the display portion in a second state,
wherein the first refresh rate corresponds to a first image signal which has a first total number of gray levels, and the second refresh rate corresponds to a second image signal which has a second total number of gray levels,
wherein the timing controller is configured to supply a start pulse, a clock signal, and a potential to the driver circuit,
wherein the potential is selected from a first potential and a second potential which is smaller than the first potential,
wherein the timing controller is configured to stop the clock signal after the start pulse stops and to change the potential from the first potential to the second potential after the clock signal stops in the first state,
wherein the timing controller is configured to start supplying the clock signal after the potential is changed from the second potential to the first potential and to start supplying the start pulse after the supply of the clock signal is started in the second state, and
wherein the second total number is smaller than the first total number.

16. The liquid crystal display device according to claim 15, wherein the timing controller comprises:
an analyzing portion configured to judge the second total number, and generate a signal corresponding to the second total number;
a lookup table portion configured to store a lookup table for determining a refresh rate in accordance with the signal; and
a panel controller controlled by the lookup table portion in accordance with the lookup table.

17. The liquid crystal display device according to claim 16, wherein the analyzing portion comprises:
a counter circuit provided for counting a bit of the image signal and configured to judge a change of the bit; and
a determining portion configured to judge whether an output from the count circuit changes or not and to output a result of the judgment to the lookup table portion.

18. The liquid crystal display device according to claim 15, wherein each pixel in the display portion comprises a transistor, and
wherein a semiconductor layer of the transistor includes an oxide semiconductor.

19. The liquid crystal display device according to claim 18, wherein the oxide semiconductor comprises at least one of indium, gallium, tin, and zinc.

20. An electronic device comprising the liquid crystal display device according to claim 15.

21. A liquid crystal display device comprising:
a driver circuit configured to control a display portion;
a timing controller configured to control the driver circuit; and
an image process circuit configured to process an image signal, and output a processing image signal to the timing controller,
wherein the timing controller is configured to convert a first refresh rate into a second refresh rate in the display portion in a first state or to convert the second refresh rate into the first refresh rate in the display portion in a second state, wherein the first refresh rate corresponds to a first image signal which has a first total number of gray levels, and the second refresh rate corresponds to the processing image signal which has a second total number of gray levels, wherein the timing controller is configured to supply a start pulse, a clock signal, and a potential to the driver circuit, wherein the potential is selected from a first potential and a second potential which is smaller than the first potential, wherein the timing controller is configured to stop the clock signal after the start pulse stops and to change the potential from the first potential to the second potential after the clock signal stops in the first state, wherein the timing controller is configured to start supplying the clock signal after the potential is changed from the second potential to the first potential and to start supplying the start pulse after the supply of the clock signal is started in the second state, and wherein the second total number is smaller than the first total number.

22. The liquid crystal display device according to claim 21, wherein the timing controller comprises:

an analyzing portion configured to judge the second total number, and generate a signal corresponding to the second total number;

a lookup table portion configured to store a lookup table for determining a refresh rate in accordance with the signal; and a panel controller controlled by the lookup table portion in accordance with the lookup table.

23. The liquid crystal display device according to claim 22, wherein the analyzing portion comprises;

a counter circuit provided for counting a bit of the image signal and configured to judge a change of the bit; and a determining portion configured to judge whether an output from the count circuit changes or not and to output a result of the judgment to the lookup table portion.

24. The liquid crystal display device according to claim 21, wherein each pixel in the display portion comprises a transistor, and wherein a semiconductor layer of the transistor includes an oxide semiconductor.

25. The liquid crystal display device according to claim 24, wherein the oxide semiconductor comprises at least one of indium, gallium, tin, and zinc.

26. An electronic device comprising the liquid crystal display device according to claim 21.

* * * * *